United States Patent [19]

Searles et al.

[11] 4,288,020

[45] Sep. 8, 1981

[54] TRACKING TYPE WELDING APPARATUS

[75] Inventors: William K. Searles; Richard J. Searles, both of Katonah; Kenneth R. Searles, Bedford Village, all of N.Y.

[73] Assignee: The Babcock & Wilcox Company, New York, N.Y.

[21] Appl. No.: 54,264

[22] Filed: Jul. 2, 1979

[51] Int. Cl.³ .................... B23K 37/02; B23Q 15/013
[52] U.S. Cl. ............................... 228/7; 74/568 M; 228/11; 219/124.34; 318/574; 318/578; 365/244
[58] Field of Search ................. 228/7, 9–11, 228/102; 219/124.34, 125.1; 318/568, 574, 578; 365/244; 346/33 MC; 74/568 M; 409/99

[56] References Cited

U.S. PATENT DOCUMENTS

| | | | |
|---|---|---|---|
| 1,644,896 | 10/1927 | Busekist-Scharnweber | 228/7 |
| 1,809,653 | 6/1931 | Wagner et al. | 228/7 |
| 1,996,131 | 4/1938 | Vreeland, Jr. | 228/11 |
| 2,089,015 | 8/1937 | Buckman et al. | 228/9 |
| 2,089,029 | 8/1937 | Jones | 228/102 |
| 2,116,593 | 5/1938 | Bouvier | 409/96 |
| 2,313,272 | 3/1943 | Schock et al. | 318/592 |
| 2,318,667 | 5/1943 | Bruce | 228/104 X |
| 2,326,247 | 8/1943 | Nicholides | 346/21 X |
| 2,331,337 | 10/1943 | Meyer | 409/84 |
| 2,383,266 | 8/1945 | Letourneau | 82/14 R |
| 2,484,331 | 10/1949 | Bels | 74/568 R |
| 2,489,305 | 11/1949 | McLennas | 250/202 |
| 2,499,178 | 2/1950 | Berry et al. | 318/577 |
| 2,510,083 | 6/1950 | Davis et al. | 228/7 X |
| 2,511,956 | 6/1950 | Wetzel | 409/99 |
| 2,532,807 | 12/1950 | Girad et al. | 219/75 |
| 2,557,824 | 6/1951 | Hornfeck | 318/578 X |
| 2,571,248 | 10/1951 | Hutt | 228/7 X |
| 2,574,104 | 11/1951 | Ireland | 318/568 |
| 2,670,423 | 2/1954 | Darner et al. | 219/124.34 X |
| 2,686,415 | 8/1954 | Griffin | 69/41 |
| 2,692,358 | 10/1954 | Wild | 318/617 |
| 2,698,217 | 12/1954 | Ford | 346/33 MC |
| 2,704,012 | 3/1955 | Trinkle | 409/100 |
| 2,721,989 | 10/1955 | Gates et al. | 318/578 X |
| 2,723,845 | 11/1955 | Przyblski et al. | 266/60 |
| 2,746,093 | 5/1956 | Raper | 19/239 |
| 2,770,975 | 11/1956 | Galley | 74/568 MC |
| 2,808,506 | 10/1957 | Skwarek | 455/178 |
| 2,811,085 | 10/1957 | Burke | 409/118 |
| 2,827,547 | 3/1958 | Tiedemann | 219/124.31 |
| 2,837,046 | 6/1958 | Carlson et al. | 318/576 X |
| 2,843,024 | 7/1958 | Armitage et al. | 409/106 |
| 2,851,643 | 9/1958 | Limberger | 318/576 X |
| 2,852,727 | 9/1958 | Barnett | 318/568 |
| 2,861,234 | 11/1958 | Martin et al. | 318/578 |
| 2,914,011 | 11/1959 | Morton | 228/29 |
| 2,921,179 | 1/1960 | Anderson | 219/124.22 |
| 2,927,992 | 3/1960 | Bateman | 219/125.1 |
| 2,971,079 | 2/1961 | Sommeria | 219/124.34 |
| 2,978,753 | 4/1961 | Mackie | 19/241 |
| 3,026,743 | 3/1962 | Curtis | 74/568 M |
| 3,059,236 | 10/1962 | Marantette | 318/568 X |
| 3,119,009 | 1/1964 | Zeller | 219/125.1 |
| 3,133,186 | 5/1964 | Green et al. | 219/124.34 |
| 3,150,624 | 9/1964 | Brems | 228/7 X |
| 3,158,121 | 11/1964 | Brems | 228/32 |
| 3,171,012 | 2/1965 | Morehead | 219/124.34 |
| 3,195,111 | 7/1965 | Kunkel | 318/568 X |
| 3,207,407 | 9/1965 | Preston et al. | 228/7 |
| 3,208,138 | 9/1965 | Eckhardt | 228/102 |
| 3,216,641 | 11/1965 | Brems | 228/7 |
| 3,267,251 | 8/1966 | Anderson | 228/7 X |
| 3,267,570 | 8/1966 | Winkler | 228/102 |
| 3,281,047 | 10/1966 | Weicht | 228/7 |
| 3,443,732 | 5/1969 | Wall, Jr. | 228/7 |
| 3,447,419 | 6/1969 | Foster | 409/218 |
| 3,448,280 | 6/1969 | Blitchington | 219/124.34 X |
| 3,467,899 | 9/1969 | Inaba et al. | 318/578 |
| 3,520,165 | 7/1969 | Dodson | 228/104 |
| 3,532,807 | 10/1970 | Webb | 228/7 |
| 3,658,232 | 4/1972 | Dill | 228/7 X |
| 3,773,240 | 11/1973 | Hiem | 228/7 X |
| 3,861,574 | 1/1975 | Hoffman et al. | 219/124.34 X |
| 3,878,761 | 4/1975 | Makowski | 409/122 |
| 3,888,405 | 6/1975 | Jones et al. | 228/8 |
| 3,924,094 | 12/1975 | Hansen et al. | 219/124.34 |
| 3,997,757 | 12/1976 | Cecil et al. | 219/124.34 |
| 4,010,346 | 3/1977 | Cecil et al. | 219/124.34 |
| 4,040,557 | 8/1977 | Heverly | 219/124.34 X |
| 4,051,342 | 9/1977 | Stubbings | 219/124.31 X |
| 4,068,154 | 1/1978 | Cecil et al. | 318/568 |
| 4,115,684 | 9/1978 | Lindom | 219/124.34 |

FOREIGN PATENT DOCUMENTS 802206 10/1958 United Kingdom .

1224601  3/1971  United Kingdom .

Primary Examiner—Gil Weidenfeld
Assistant Examiner—K. J. Ramsey
Attorney, Agent, or Firm—Fitzpatrick, Cella, Harper & Scinto

[57] ABSTRACT

A tracking type welding apparatus wherein a torch follows a probe along a weld seam and the probe senses lateral seam deviations and stores them in a pin cam and wherein the deviations are later used to move the torch in the same manner. The pin cam is remote from the torch and probe assembly and is electrically synchronized with it. Means are also disclosed to permit a single pin cam wheel to store horizontal and vertical deviation information and gap width information simultaneously.

29 Claims, 20 Drawing Figures

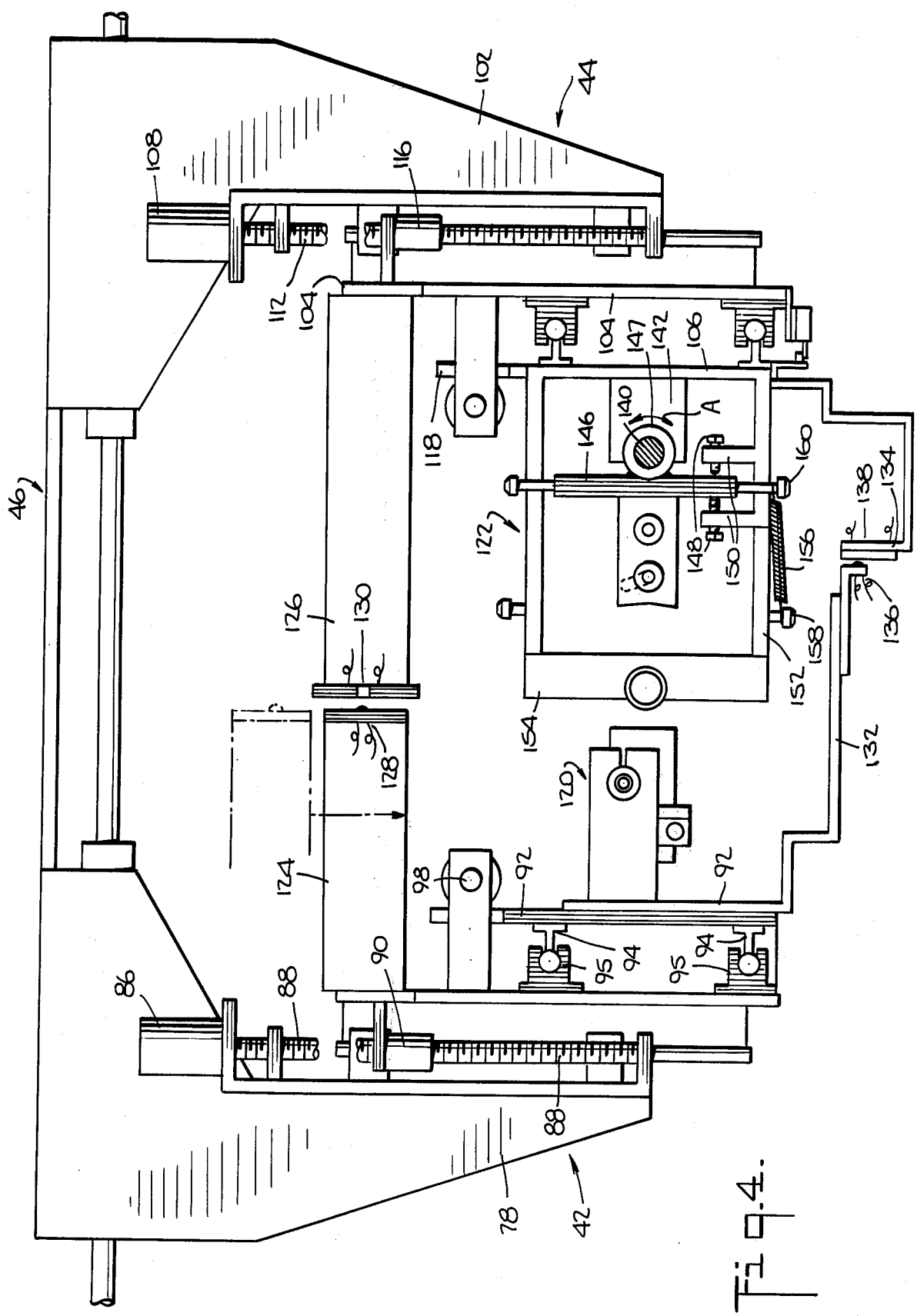

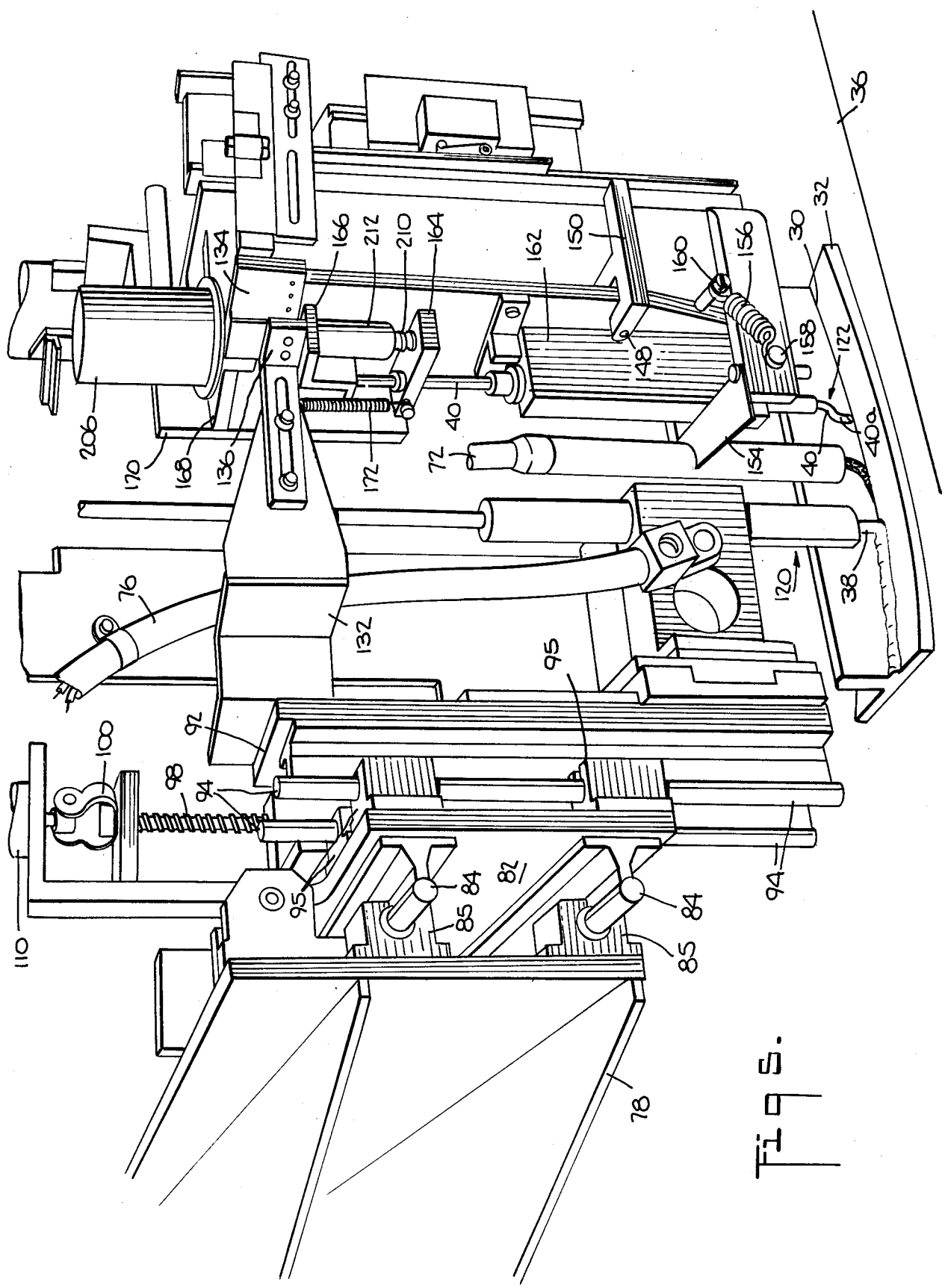

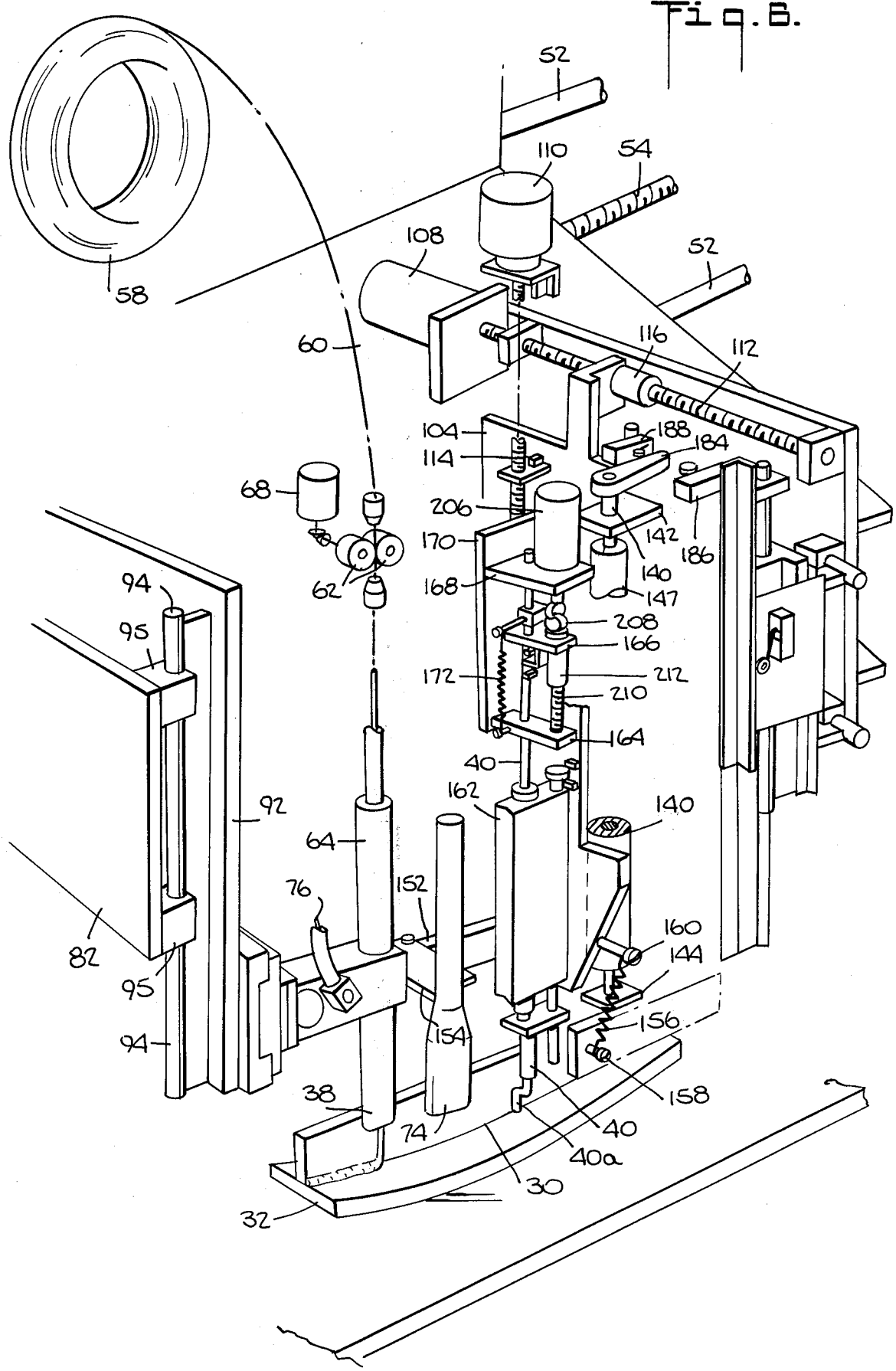

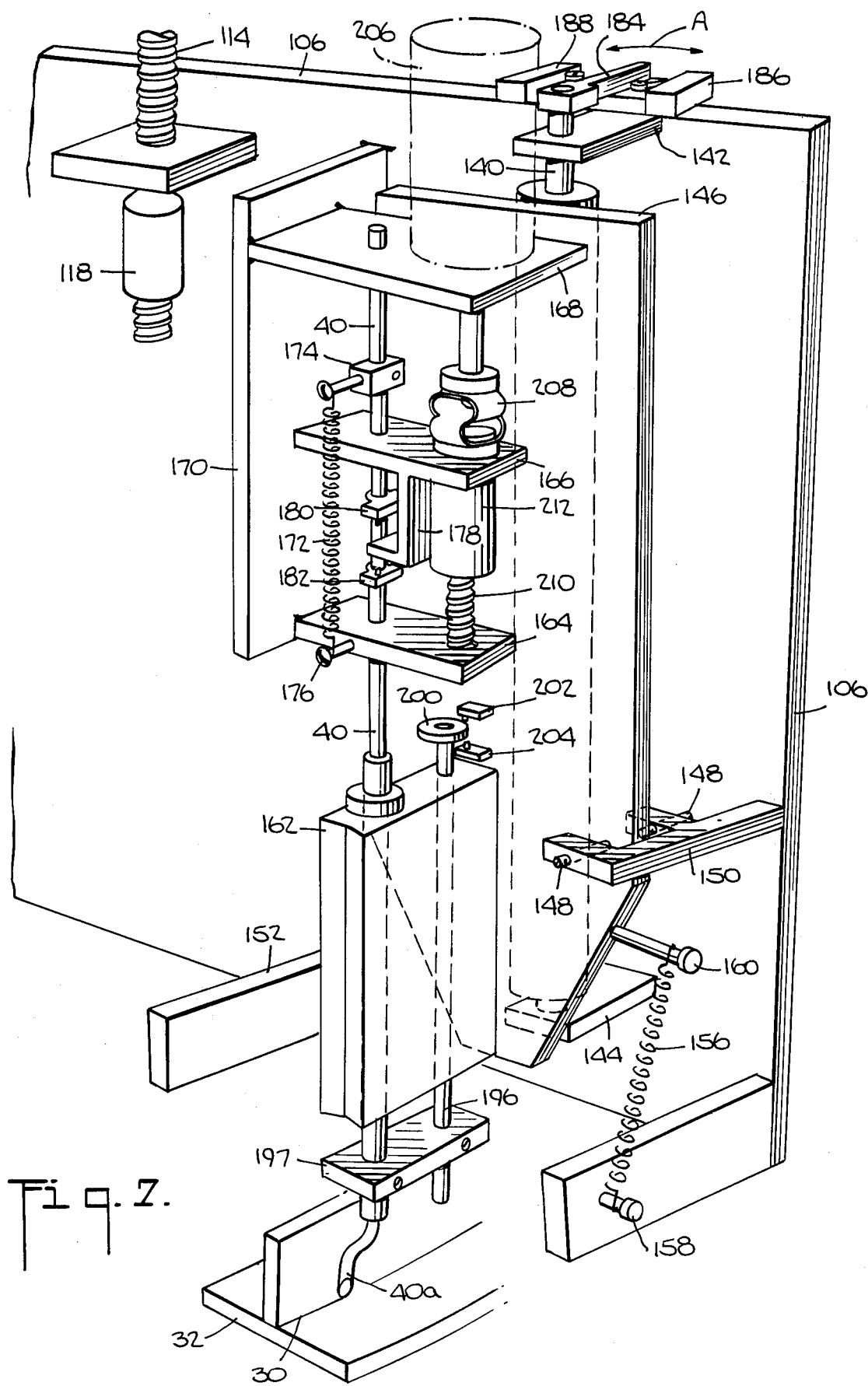

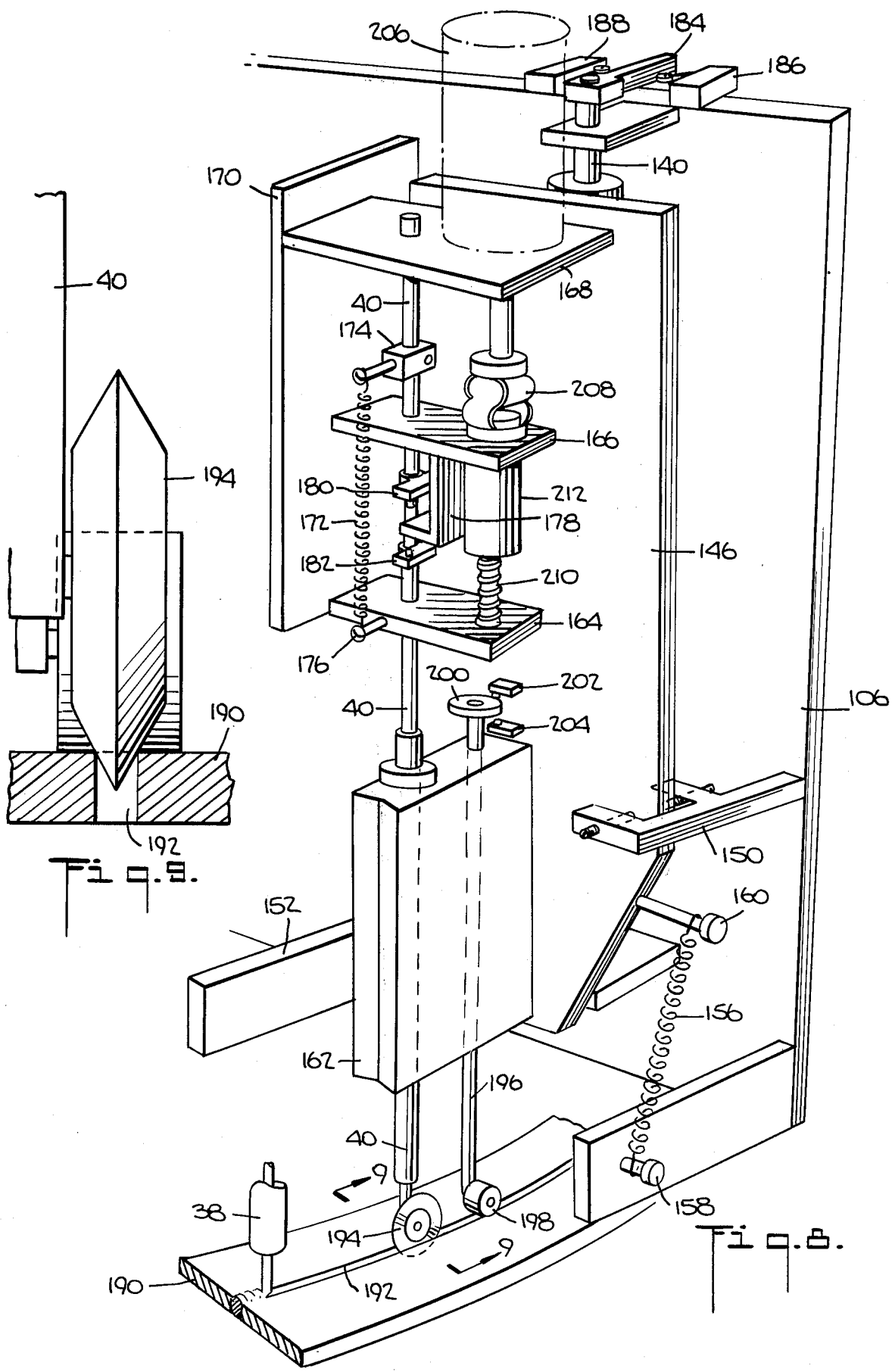

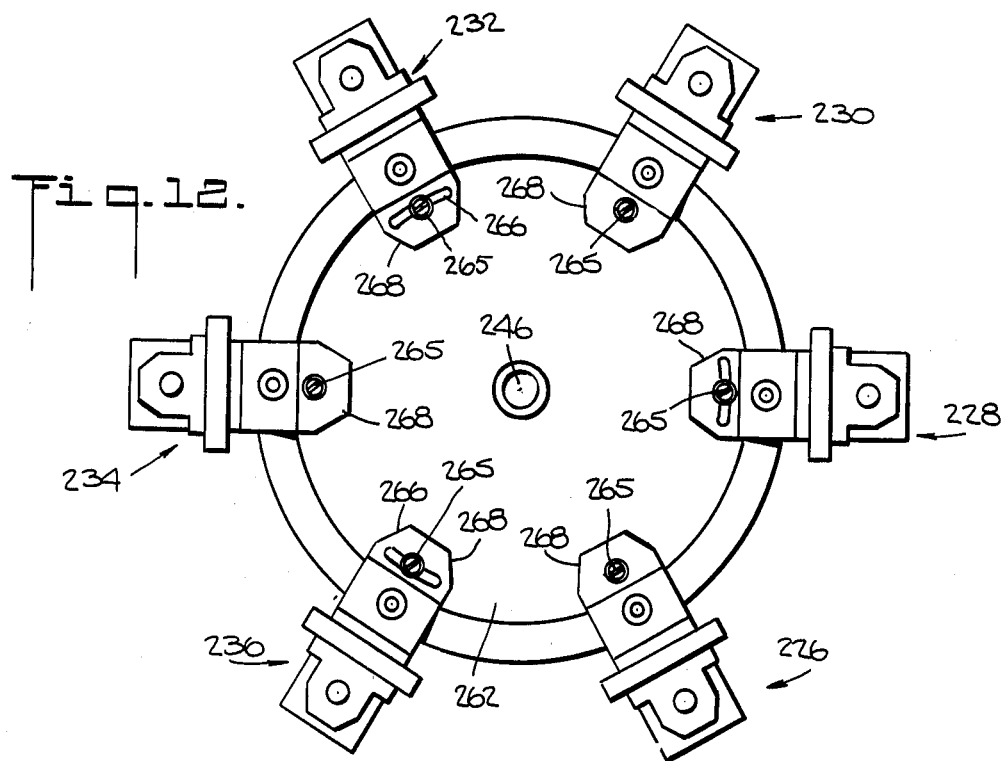
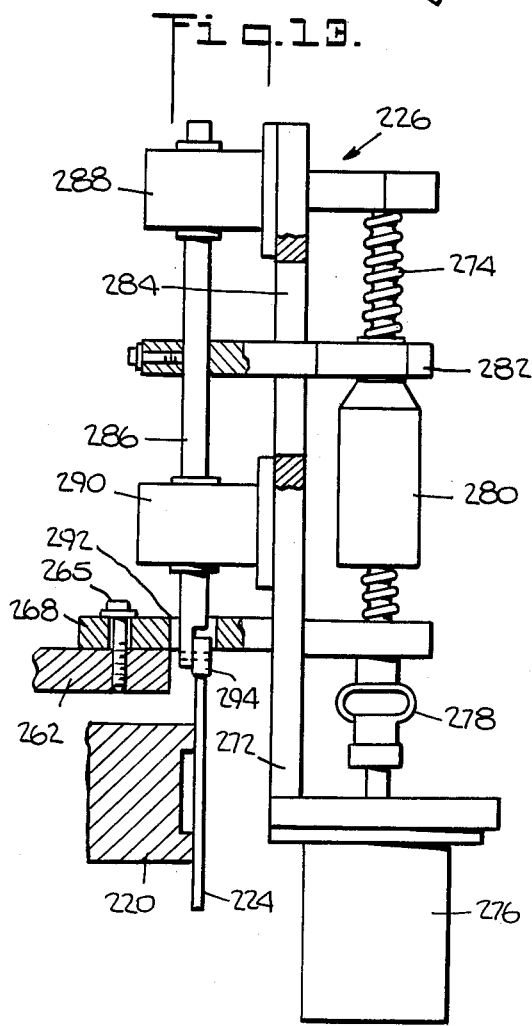
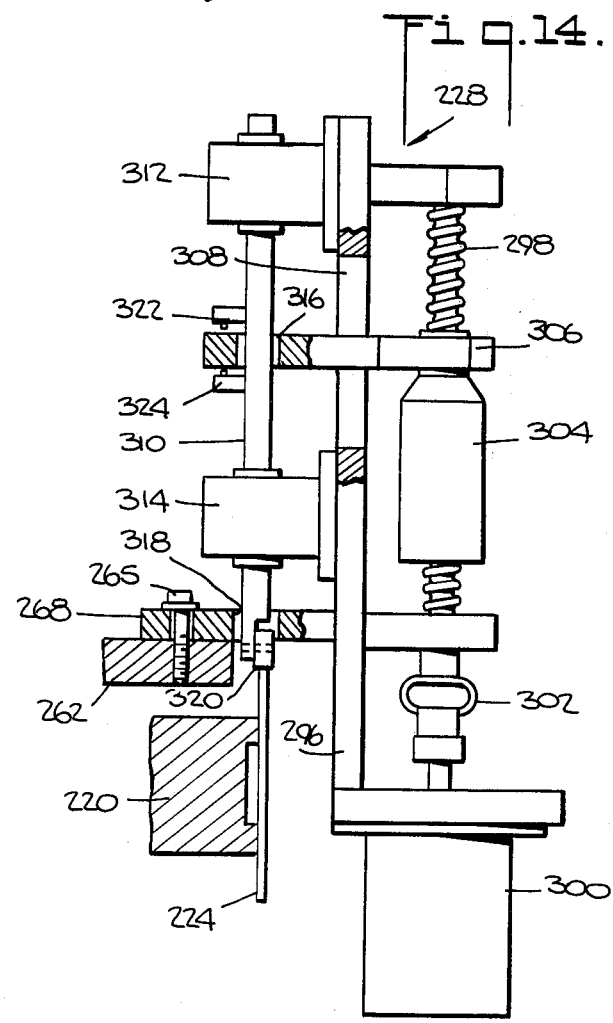

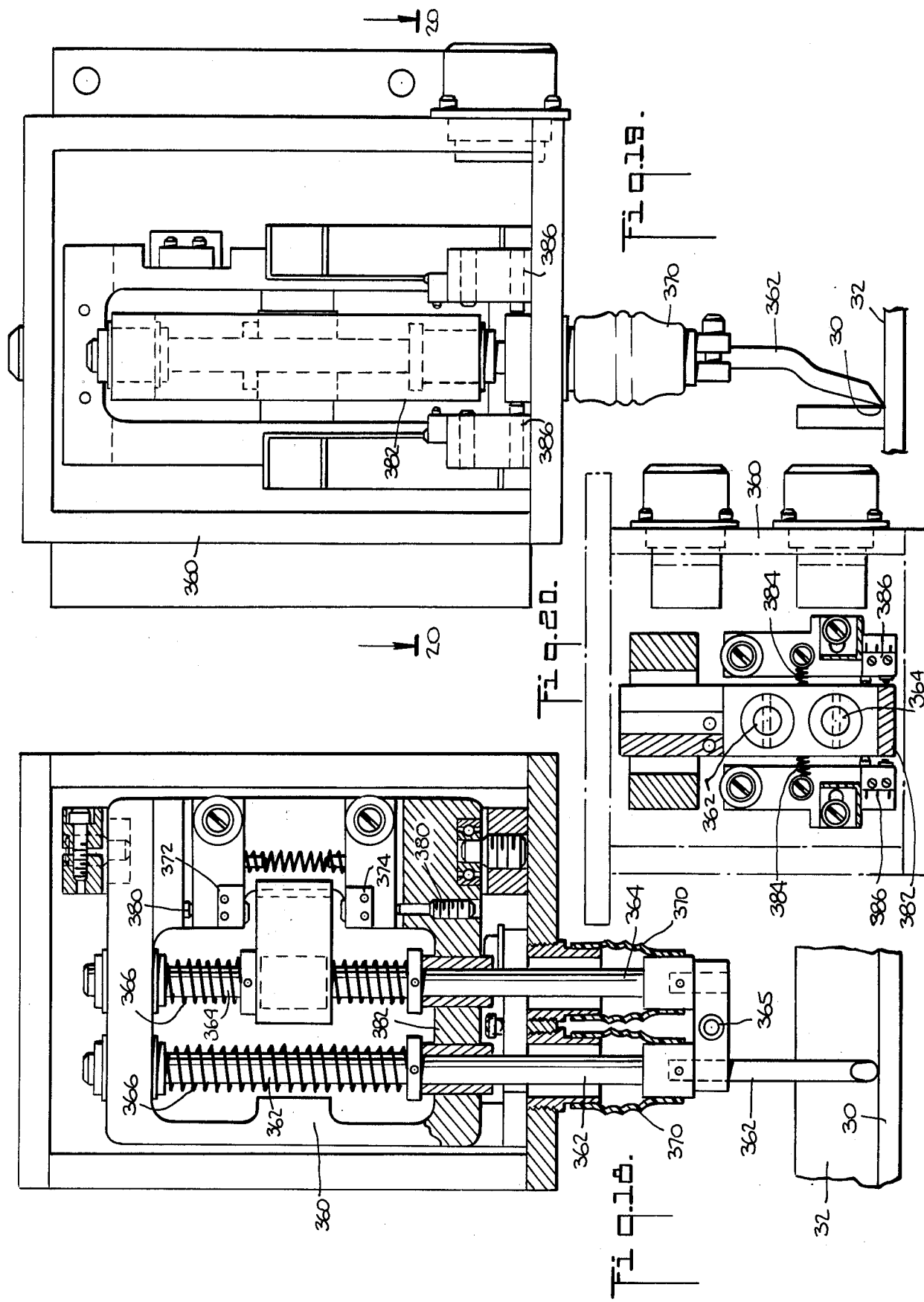

TRACKING TYPE WELDING APPARATUS

BACKGROUND OF THE INVENTION

1. Field of the Invention

This invention relates to welding apparatus and more particularly it concerns improvements to welding apparatus of the type wherein a probe follows deviations of a seam to be welded, a storage device in the form of a settable contour cam is set according to probe movements and a welding torch, which is maintained a fixed distance behind the probe, is driven in accordance with the cam settings so that the torch is positioned in the weld seam.

2. Description of the Prior Art

U.S. Pat. Nos. 3,158,121 and 3,281,047 both describe welding machines wherein a probe tracks a seam to be welded and wherein the tracking movements of the probe are mechanically linked to a pin type contour cam. The contour cam comprises a group of pins mounted side-by-side on a wheel which turns in synchronism with the movements of a probe and following torch assembly with respect to a workpiece being welded. The pins are moved longitudinally on the wheel by the action of the probe as it follows the weld seam deviations on the workpiece; and locking means are provided to hold the pins tightly in place on the wheel after they have been set by the probe. The following torch is mounted to move in the same direction as the probe when it follows the weld seam deviations; and the torch, which is mechanically linked to a follower riding on the pins is thus positioned in accordance with the probe.

In U.S. Pat. No. 3,281,407 two cam wheels are provided, one to record the vertical probe movements and the other to record the lateral probe movements.

In another U.S. Pat. No. 4,068,154, there is described a welding machine in which the probe movements are stated to be converted to digital signals which are processed through shift registers and then are used to drive the torch to corresponding positions.

The welding devices of U.S. Pat. Nos. 3,158,121 and 3,281,047 suffer from disadvantage that the cam pins must be locked by special locking means which are complicated and cumbersome but which are necessary because of the fact that they must move a cam follower which is linked to the torch. Because of this tracking accuracy is unreliable. The welding machine of U.S. Pat. No. 4,068,154 uses digital signal processing which may not be suitable for some applications. Also the storage means in that welding machine is not readily adaptable to variations or adjustments in probe to torch distance.

A further disadvantage of the prior art tracking type welding machines is that they require the use of design cams to follow large contour deviations. These design cams have to be provided with special follower assemblies and they must be replaced for each different workpiece design being welded.

SUMMARY OF THE INVENTION

The present invention overcomes these problems of the prior art. The present invention in one aspect provides an improved tracker type welding apparatus of the pin cam memory type which is more accurate and reliable than those used in prior welding apparatus. According to this aspect a pin type contour cam is located remotely from the probe and torch assembly. The contour cam has a driven pin setter and an electrical signal producing pin reader mounted at a predetermined distance from each other along the line of pins in the contour cam. The probe and torch assembly includes a driven torch and an electrical signal producing probe also mounted a predetermined distance from each other along the weld line on a workpiece being welded. A first synchronizing means is connected between a main drive which produces relative movement between a workpiece and the probe and torch assembly and a cam drive means which produces relative movement between the cam pins and the pin reader and setter. A second synchronizing means is connected between the probe and pin setter and generates pin setter drive signals in synchronism with electrical probe movement signals. A third synchronizing means is connected between the pin reader and the torch and generates torch drive signals in synchronism with the electrical reader signals.

According to a further aspect of the invention both the probe and the pin reader include drive motors connected to sensors on the probe and pin reader so that the probe and reader drive themselves as they follow contour deviations of the workpiece and the cam pins. This arrangement facilitates synchronization of the probe and pin setter and of the pin reader and torch since their respective drive motors need merely be connected together to be driven by the same signals. Further, the self-driven probe and pin reader minimizes the back pressure imposed on the workpiece and on the cam pins and thereby a high degree of accuracy is attained during the welding operation.

According to another aspect of the invention there is provided in a tracker type welding apparatus a novel pin cam wheel having several groups of pin setters and readers to simultaneously store signals representative of both horizontal and vertical weld seam deviations and, if desired, signals representative of weld gap width variations.

In another aspect of the invention there are provided novel probe arrangements which enable the unambiguous sensing of the width of a gap in spite of elevational deviations of the workpiece containing the gap. These novel arrangements include a wedge shaped gap sensor which is moved down into wide gaps and is moved up as the gap narrows. The gap sensor is mounted to control movements of a driven auxiliary slide which in turn is mounted on the main probe slide. The main probe slide also has a sensor which senses the elevational deviations of the workpiece alongside the gap. Because the auxiliary slide is moved up and down with the elevational deviations of the workpiece the signals generated by the up and down movements of the auxiliary slide on the main probe slide represent only the variations in gap width. These signals can be stored in a sector of the pin cam and can then be read out and used to control the weld wire feed rate so that its corresponds to the actual width of the gap being filled.

There has thus been outlined rather broadly the more important features of the invention in order that the detailed description thereof that follows may be better understood, and in order that the present contribution to the art may be better appreciated. There are, of course, additional features of the invention that will be described more fully hereinafter. Those skilled in the art will appreciate that the conception on which this disclosure is based may readily be utilized as the basis for the designing of other arrangements for carrying out the several purposes of the invention. It is important, therefore, that this disclosure be regarded as including such equivalent arrangements as do not depart from the spirit and scope of the invention.

BRIEF DESCRIPTION OF THE DRAWINGS

Preferred embodiments of the invention have been chosen for purposes of illustration and description, and are shown in the accompanying drawings, forming a part of the specification, wherein:

FIG. 4 is a plan view of the torch and probe saddle arrangement of FIG. 2;

FIG. 5 is a further enlarged perspective view showing a torch and probe of the welding apparatus of FIG. 1 in a welding operation;

FIG. 6 is a view similar to FIG. 5 with some parts removed for clarity;

FIG. 7 is a view similar to FIG. 6 with additional parts removed for clarity;

FIG. 8 is a view similar to FIG. 7 but illustrating a weld gap variation sensing arrangement.

FIG. 9 is an enlarged fragmentary section view taken along line 9—9 of FIG. 8;

FIG. 12 is a plan view of the memory device taken along line 12—12 of FIG. 10;

FIG. 13 is an elevational view of a pin setter taken along line 13—13 of FIG. 10;

FIG. 14 is an elevational view of a pin reader taken along line 14—14 of FIG. 10;

FIG. 18 is a front elevational view, partially in section of a preferred form of probe holder which may be used in the embodiments of FIGS. 1 and 17;

FIG. 19 is a side elevational view of the probe holder of FIG. 18; and

FIG. 20 is a section view taken along line 20—20 of FIG. 19.

DETAILED DESCRIPTION OF THE PREFERRED EMBODIMENTS

Figure 1:
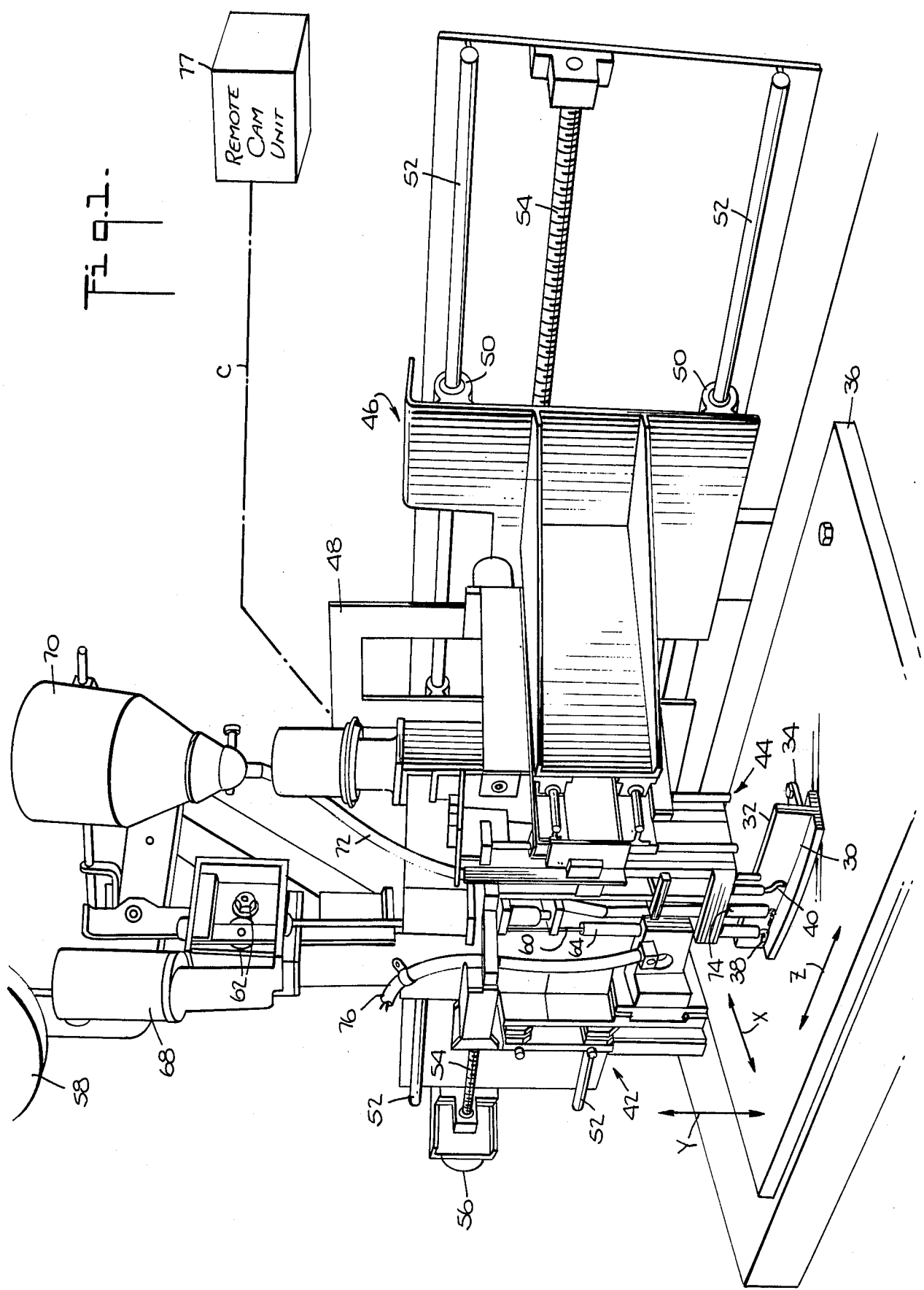
FIG. 1 is a perspective view, partially schematic, of a welding apparatus embodying the present invention.

The welding apparatus of FIG. 1 operates to follow and weld a seam 30 along a workpiece 32. The workpiece in turn is clamped by means of a workpiece clamp 34 to a stationary workpiece table 36.

Welding is carried out by means of an electrical arc from an arc welding torch 38 which is driven along the seam 30. The seam 30 is not straight but may vary laterally, either in the horizontal or vertical direction, or both, along the general direction in which the seam extends. The torch 38 is caused to follow these variations with great precision by means of the arrangements to be described hereinafter.

A probe 40 is positioned ahead of the torch 38, in the direction of torch movement along the seam (i.e. in the direction of the arrow Z), by an amount sufficient to avoid the heating effects of the torch.

The torch 38 is mounted for lateral and vertical movement (i.e. in the direction of arrows X and Y) by means of a torch saddle 42. Similarly, the probe 40 is also mounted for vertical and lateral movement by means of a probe saddle 44. The torch and probe saddle 40 and 42 form portions of a main saddle 46 which moves in a horizontal direction Z along which the seam 30 extends. The probe and torch saddles are maintained a fixed distance from each other in the Z direction by means of a spacer arm 48 which interconnects them.

The main saddle 46 is mounted by means of main saddle slides 50 to move along main saddle ways 52 which extend in the Z direction. A main saddle drive screw 54 is provided to extend along the Z direction and to engage a ball screw (not shown in FIG. 1) mounted on the main saddle 46. The main saddle drive screw is driven by means of a main saddle drive motor 56 mounted at one end of the apparatus.

A weld wire spool 58 is supported on the torch saddle 42 and weld wire 60 from this spool passes down through weld wire drive rolls 62 and a weld wire guide 64 to the torch 38. A weld wire drive motor 68 operates the drive rolls 62 to feed the weld wire 60 to the torch at a precisely controlled rate in accordance with the requirements of the welding operation being carried out.

A flux hopper 70 is also mounted on the torch saddle 42 and a flux supply tube 72 extends down from the hopper to a flux nozzle 74 located just ahead of the torch to provide a required amount of flux to the welding operation.

Electrical current for carrying out the welding operation is supplied from a source (not shown) via a current supply line 76 to the torch 38. The electrical aspects of the welding operation carried out by this invention are the same as in conventional arc welding operations in that electrical current is fed to a weld wire at one polarity and an arc is struck between the tip of the weld wire and the workpiece which is at a different polarity. The resulting flow of electrical current produces heat which melts the weld wire and fuses it to the workpiece material.

It is important in carrying out such welding operations that the weld wire be positioned precisely by the torch to follow the seam and that during the welding operation the weld wire is fed at a precise rate corresponding to the width of the seam being welded. This width may vary along the seam and accordingly the rate of wire feed must also be varied. The present invention permits this to be done easily and with a high degree of accuracy.

In operation of the apparatus of FIG. 1 the main saddle drive motor 56 drives the main saddle 46 along the ways 52 so that the torch saddle 42 and the probe saddle 44 move in the Z direction i.e. along the general path of the seam 30 being welded. During this movement the probe 40 follows the vertical and lateral (Y and X direction) seam deviations and at the same time generates electrical signals representative of these deviations. These signals are transmitted over cables, indicated schematically at C, to a remote adjustable contour cam unit 77. Signals from the main saddle drive motor, which represent the amount of main saddle movement, are also transmitted via the cable C to the cam unit 77. The cam unit 77 stores the Y and X deviation signals for a duration corresponding to the length of time required for the torch 38 to traverse the distance between the torch and probe, and then the stored signals are transmitted back from the cam unit 77 to the torch saddle to position the torch 38 at the precise location of the weld seam. When the apparatus uses a gap width detection feature as will be described more fully hereinafter, detected gap width signals are stored in the cam unit 77 and are thereafter used to adjust the speed of the weld wire drive motor 68.

Figure 2:
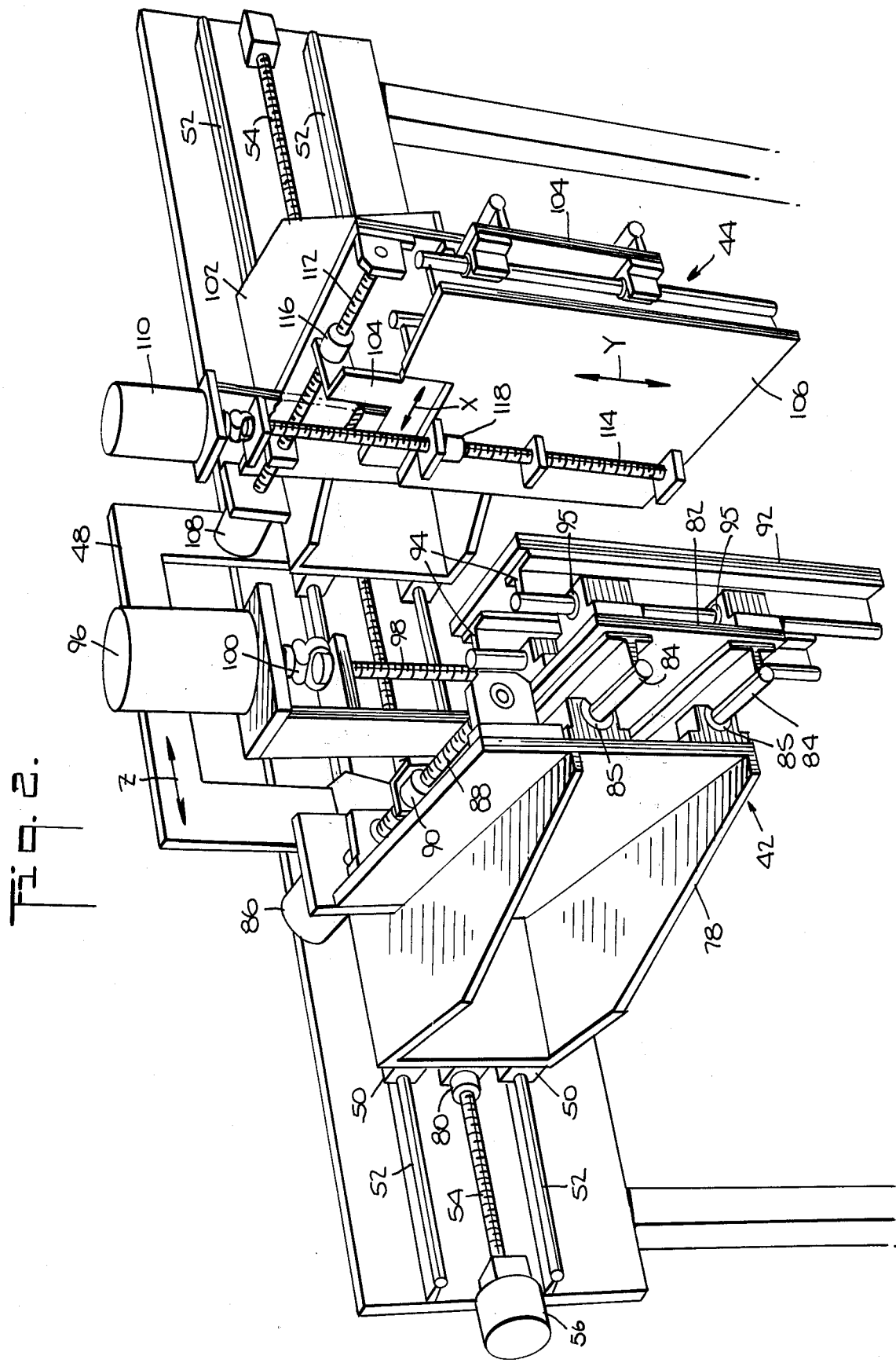
FIG. 2 is a fragmentary perspective view of a torch and probe saddle arrangement forming a portion of the welding apparatus of FIG. 1.

The torch and probe saddles 42 and 44 are shown in FIG. 2 with the torch and probe and various other elements missing to assist in visualizing their construction and operation. As can be seen in FIG. 2 the torch saddle 42 is an assembly made up of a torch saddle base 78 which extends out from the main saddle ways 52 and is mounted on the ways by the main saddle slides 50. A main saddle ball screw 80 is also mounted on the base 78 and engages the main saddle drive screw 54. Thus as the main saddle drive motor 56 turns the drive screw 54. This in turn operates via the ball screw 80 to drive the main saddle 46, including the torch saddle 42 and the probe saddle 44 along the main saddle ways 52 in the Z direction. During this movement the spacer arm 48 maintains the torch and probe saddles a fixed distance from each other.

The torch saddle 42 includes a horizontal torch slide 82 which is mounted for movement in the lateral or X direction on the torch saddle base 78. As can be seen in FIG. 2 the horizontal torch slide 82 is provided with horizontal ways 84 which move horizontally through glides 85 on the torch saddle base. The horizontal torch slide 82 is driven in the X direction by means of a screw drive comprising a horizontal torch drive motor 86 mounted on the torch saddle base 78, a horizontally extending horizontal drive screw 88 driven by the motor 86 and a ball screw 90 on the slide 82 which engages the drive screw 88. Depending on the direction and amounts of rotation of the horizontal torch drive motor 86 the horizontal torch slide may be driven to various positions in the X direction.

The torch saddle 42 also includes a vertical torch slide 92 which is mounted for movement in the vertical or Y direction on the horizontal torch slide 82. The vertical torch slide 92 is provided with vertical ways 94 which move vertically through glides 95 in the horizontal torch slide. The vertical torch slide is driven in the Y direction by means of a screw drive comprising a vertical torch drive motor 96 mounted on the horizontal torch slide 82, a vertically extending vertical drive screw 98 driven by the motor 96 and a ball screw (not shown in FIG. 2) on the vertical slide 92 which engages the drive screw 98. The vertical torch drive motor 96 is shown in FIG. 2 to be connected to the drive screw 98 by means of a flexible universal coupling 100. It will be understood that such couplings are preferably included on all the drive screws used in this apparatus.

Figure 3:
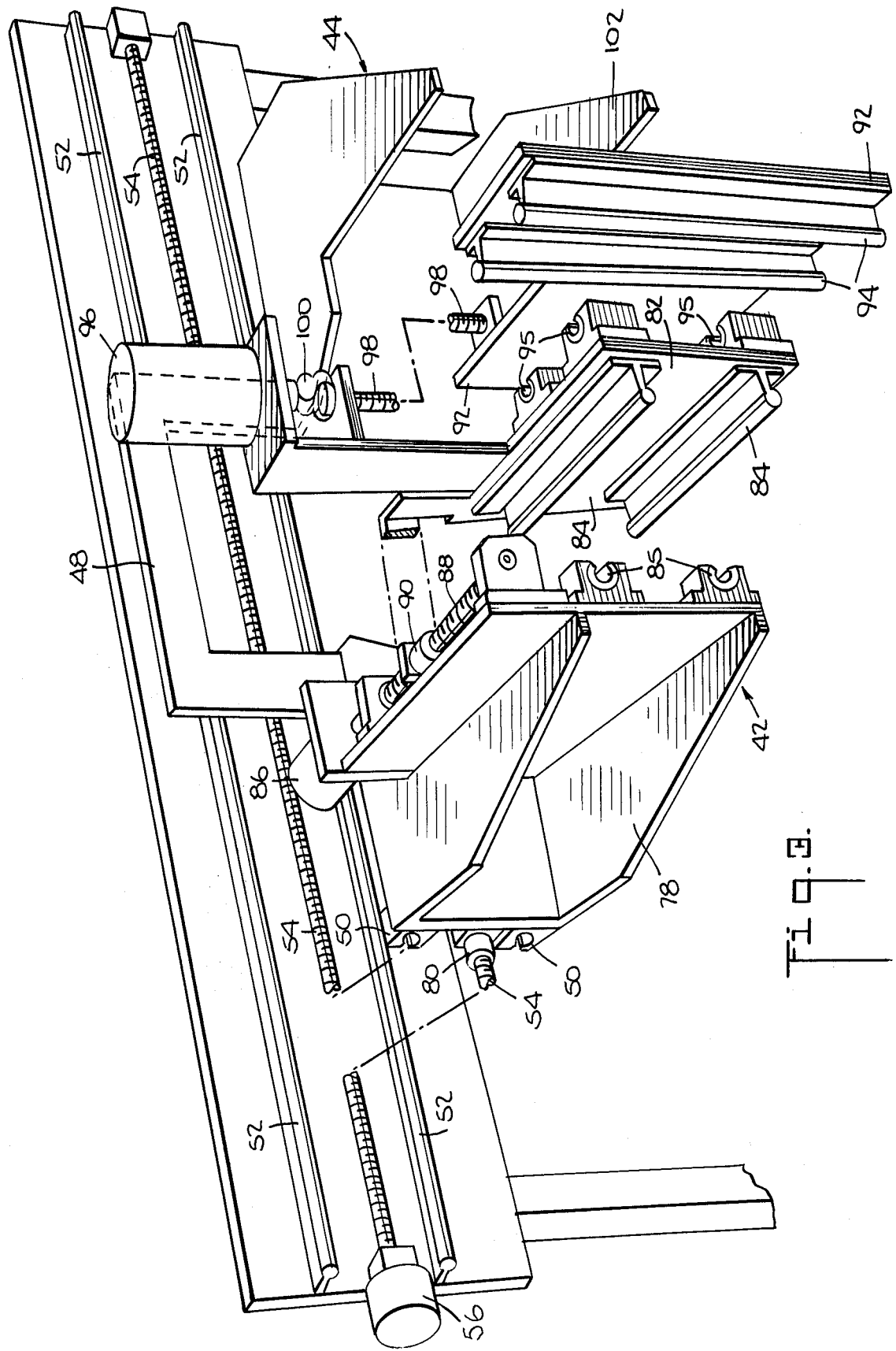
FIG. 3 is a view similar to FIG. 2 with some parts removed and some parts shown exploded for clarity.

Turning now to FIG. 3 it will be seen from this exploded view how the various elements of the torch saddle move with respect to each other and to the main saddle. It will also be seen that by controlling the direction and extent of rotation of the horizontal and vertical torch drive motors 86 and 96 the vertical torch slide 92 may be precisely adjusted in the X and Y directions while the main saddle 46 moves along the Z direction.

The probe saddle 44 is of the same general construction as the torch saddle 42 and as can be seen in FIG. 2, it comprises a probe saddle base 102, a horizontal probe slide 104 movable on the base in the X direction, a vertical probe slide 106 movable on the horizontal probe slide 104 in the Y direction and horizontal and vertical drive motors 108 and 110 mounted respectively on the base 102 and the horizontal probe slide 104. Also the drive motors 108 and 110 turn horizontal and vertical probe drive screws 112 and 114 which engage ball screws 116 and 118 on the horizontal and vertical probe slides 104 and 106 respectively.

It will be seen from the foregoing that the vertical probe slide 106 may be positioned in the X and Y directions in the same manner as, but independently of the vertical torch slide 92.

FIG. 4 shows a top plan view of the torch and probe saddles 42 and 44 with torch and probe assemblies 120 and 122 mounted on the vertical torch and probe slides 92 and 106. As can also be seen in FIG. 4 horizontal alignment arms 124 and 126 are mounted on the horizontal torch and probe slides 82 and 104 respectively. These arms extend toward each other and they are provided with proximity sensors, such as a light 128 and photocell 130. The arms are arranged such that the light and photocell come close to each other and produce a signal when the torch and probe are in lateral alignment. As will be described more fully hereinafter these proximity sensors are used to position the torch laterally (i.e. in the X direction) in alignment with the probe after the probe has been positioned at the start of the seam 30 or the workpiece. Likewise, a pair of vertical alignment arms 132 and 134 are provided on the vertical torch and probe slides 92 and 106 respectively and these arms also are provided with proximity sensors such as a light 136 and a photocell 138 which produce an electrical signal when the torch and probe are in vertical (i.e. Y direction) alignment. The alignment arm and photocell arrangement, as will be described below, is used to position the torch 38 in alignment with the probe 40 after the probe itself has been positioned at the start of the seam 30.

FIGS. 4–8 show the construction of the probe assembly 122. As can be seen in FIGS. 4 and 6, a vertical pivot rod 140 extends upwardly next to the vertical probe slide 106 and is mounted on the probe slide by means of upper and lower pivot rod supports 142 and 144 (FIG. 6). A probe plate 146 is fixed to the rod 140 and can pivot on the rod as indicated by the arrow A in FIG. 4. This pivoting movement is limited by adjustment screws 148 which are supported on adjustment screw arms 150 mounted on the vertical probe slide 106. One edge of the probe plate 146 extends between the screws 148 and abuts one or another of the screws at the limits of its pivotal movement. A pair of horizontal support arms 152 extend out from the probe slide 106 near its lower edge and a flux tube support 154 extends between the outer ends of these arms. As can be seen in FIG. 6, the flux tube support 154 holds the flux nozzle 74. A horizontal bias spring 156 extends in tension between spring mounting screws 158 and 160 on the probe plate 146 and one of the horizontal support arms 152. This spring serves to hold the probe plate 146 pivoted in a clockwise direction as viewed in FIG. 4.

A vertical probe block 162 is mounted on the probe plate 146, and extends out from the probe plate 146 in the direction of the torch saddle 46. The probe block 162 has a vertical hole extending through it and the probe 40 extends through this hole and is guided in it for limited up and down movement, i.e. in the Y direction. The lower end of the probe 40 is curved, as at 40a (FIGS. 6 and 7) toward the seam 30 so that the end of the probe is free to press in at the seam. The lower end of the probe may have other configurations according to the particular shape of the workpiece elements 32 which form the seam 30.

A vertical sensing probe rod 196 also extends through the probe block 162 and is guided therein for up and down movement parallel and adjacent to the probe 40. The apparatus as shown in FIGS. 5–7 can readily be modified, as will be described in connection with FIGS. 8 and 9, to sense not only vertical and lateral workpiece deviations but also workpiece gap width diviations. As the system is set up in FIGS. 5–7 however, the apparatus responds only to vertical and lateral workpiece deviations. For this purpose the lower end of the vertical sensing probe rod terminates well above the workpiece 30 but it is attached by means of a connector block 197 to the probe 40 so that the probe rod 196 moves up and down with movements of the probe 40.

A vertical switch actuation arm 200 is mounted on the upper end of the vertical probe rod 196 and this switch actuation arm extends between closely positioned up-sensing and down-sensing microswitches 202 and 204 mounted on the probe plate 146. These switches are part of an electrical control system (described in detail hereinafter) which operates the probe vertical drive motor 110 to move the vertical probe slide up an down.

The upper end of the probe 40 also passes through lower, central and upper horizontal guide plates 164, 166 and 168. The lower and upper guide plates 164 and 168 extend out from a side plate 170 which in turn is fixed to the probe slide 146. The central guide plate 166 is moveable up and down, i.e. in the Y direction, relative to the probe plate 146. A vertical bias spring 172 is tension mounted between a block 174 on the probe 40 and a screw 176 on the lower horizontal guide plate 164.

As can be seen in FIGS. 6 and 7 the spring 172 biases the probe 40 downwardly against the lower portion of the workpiece 32 while the horizontal bias spring 156 biases the probe plate 146 in a direction to swing the probe 40 against the side portion of the workpiece. It will be appreciated that as the seam 30 deviates laterally (X direction) or vertically (Y direction) while the probe is moved forwardly (Z direction) along the seam, the bias springs 156 and 172 will cause the probe 40 to press against the workpiece and thus follow these lateral and vertical deviations. Upward and downward deviations (Y direction) are followed by the probe 40 as it is held downwardly against the seam by the spring 172. These Y direction deviations cause the probe 40 to move up and down; and in the arrangement of FIGS. 5–7. These movements are communicated via the connector block 197 to sensing probe rod 196. Lateral deviations (X direction) of the seam 30 are followed by the probe 40 as it is held in against the seam 30 by the spring 156. These X direction deviations cause the entire probe block 162 and the probe plate 146 to pivot about the vertical pivot rod 140. The bias springs 156 and 172, as hereinafter explained, serve to provide the probe with a seam hunting or seam seeking characteristic.

In operation of the welding apparatus as thus far described, the probe saddle 44 moves in the Z direction with the probe 40 following the seam 30, an upward deviation in the seam will cause the probe 40 to move up against the bias of the spring 172. This movement is communicated to the vertical probe rod 196 which in turn moves the arm 200 to actuate the up sensing microswitch 202. This in turn causes the vertical drive motor 110 (FIG. 2) to move the vertical probe slide 106, with the probe 40 mounted thereon, upwardly until the switch 202, which is carried on the probe plate 146, is moved upwardly from the arm 200 and becomes deactuated. Downward deviations of the seam 30 are accommodated in the same manner, with the probe 40 in the latter case causing the rod 196 and arm 200 to actuate the down sensing microswitch 204 and causing the motor 110 to drive in the opposite direction.

Lateral (X direction) deviations of the seam 30 cause the probe 40 to move the probe block 162 and the probe plate 146 so that they pivot about the vertical pivot rod 140. These pivoting movements are sensed by means of a pivot sensing arm 184 mounted to the upper end of the pivot rod 140 and extending between in sensing and out sensing microswitches 186 and 188 on the vertical probe slide 106. If during movement of the probe saddle 44, the probe 40 should encounter lateral (X direction) deviations in an outer direction (away from the main saddle ways 52) the probe block 162 and the probe plate 146 will pivot in a counterclockwise direction as viewed in FIG. 4. Very little such movement is required before the pivot sensing arm 184 actuates the out sensing microswitch 188. This switch is connected, through circuit arrangements to be described, to operate the horizontal drive motor 108 (FIG. 2) to drive the horizontal probe saddle 104 until the probe 40 is moved to a position where it no longer pivots the probe block 162 and the probe plate 146 and the pivot sensing arm 184 no longer actuates the out sensing microswitch 188.

It will be appreciated from the foregoing that the probe 40 may be caused to follow both horizontal and vertical seam deviations of large extent and yet because the sensing and probe driving functions are separated the system will also respond accurately to very minute deviations.

It should be understood that the horizontal and vertical bias springs 156 and 172 may be replaced by other bias devices such as magnets. Also, depending on the configuration of the seam to be followed, the bias directions can be reversed. For example, where the probe is to follow the bottom of a groove, first along one lower corner and thereafter along an opposite corner, the horizontal bias may first be set to urge the probe against the first corner and then at an appropriate time during the welding operation the horizontal bias may be switched to bias the probe against the opposite corner.

It will be noted that the only force exerted by the probe system against the workpiece is that imposed by the bias springs 156 and 172. The probe assembly itself is driven by means of the probe drive motors 108 and 110. This arrangement utilizing probe drive motors allows substantial probe movements with minimal reaction on the workpiece. As a result there is little danger of workpiece distortion by the probe and a very accurate weld is achieved.

FIGS. 8 and 9 illustrate the manner in which the apparatus may be adapted to permit the welding machine not only to follow lateral and vertical deviations of a workpiece, but at the same time, if a gap in the workpiece is being filled, the system will measure variations in gap width and provide appropriate signals to control the feed of welding wire or other welding parameters such as welding current or voltage or main saddle travel speed, so that the gap width variations will be accommodated and properly welded. Moreover, these gap width variations can be followed accurately and unambiguously irrespective of the simultaneous occurrence of vertical workpiece deviations.

In FIG. 8 there is shown a workpiece 190 which has a gap 192 of varying width. The probe 40 is fitted with a gap sensing wheel 194 which, as shown in FIG. 9, has a tapered or wedge shaped periphery. The tapered periphery of the wheel 194 fits down into the gap 192 until the edges of the gap contact the tapered sides of the wheel. As the gap widens the wheel may move downwardly; and as the gap narrows the wheel will be forced upwardly.

It will be appreciated that if the workpiece 190 experiences vertical deviations the wheel 194 will also move up and down to follow those deviations in the same manner that it would if it were sensing gap width variations. The arrangements of FIG. 8 serve to separate the gap width deviations from the vertical deviations and thereby avoid potential ambiguities. As shown in FIG. 8, a gap fill probe drive motor 206 is mounted on the upper horizontal guide plate 168. This plate in turn is supported by the side plate 170 which is attached to the probe plate 146. The motor 206 drives, via a coupling 208, a drive screw 210 which passes through a ball screw drive 212. The ball screw drive 212 is attached to the central horizontal guide plate 166 so that operation of the motor 206 causes the guide plate 166 to move up and down relative to the probe plate 146 and the vertical probe slide 106.

The central horizontal guide plate 166 is provided with a vertical movement sensing arm 178 which extends close to the probe 40. An up sensing microswitch 180 and a down sensing microswitch 182 are mounted on the probe 40 in closely spaced relation above and below the arm 178. These switches, as will be explained more fully hereinafter, are connected to operate the gap fill drive motor 206 which in turn moves the plate 166 and the arm 178 up and down.

To convert the apparatus to operate in its gap fill mode, the connector block 197 (FIG. 7) is removed and, as shown in FIG. 8, a vertical deviation sensing roller 198 is mounted on the lower end of the vertical probe rod 196. The roller 198 contacts the surface of the workpiece 32 but does not enter the gap 192.

During operation of the apparatus in its gap fill sensing mode, the roller 198 rides along the surface of the workpiece 32; and when vertical deviations occur the roller causes the rod 196 to move up and down accordingly. This actuates the microswitches 202 and 204 which in turn control operation of the vertical probe drive motor 110 which moves the vertical probe slide 106 up and down to follow the vertical workpiece deviations sensed by the roller 198. Since the probe plate 146 and the horizontal plate 166 and sensing arm 178 are carried on the probe slide 106, the sensing arm 178 follows these vertical deviations and does not activate either of the microswitches 180 or 182. Thus so long as the width of the gap 192 does not change, the wheel 194 will not move up or down relative to the probe plate 146. When, however, the gap width narrows or widens, the wheel 194 will move up or down accordingly and this movement will be communicated via the probe 40 to the microswitches 180 and 182, moving them vertically relative to the vertical movement sensing arm 178. This relative movement actuates one or the other of the switches 180 and 182. The resulting electrical signals are then supplied to operate the gap fill drive motor 206 which turns the screw 210 and causes the ball screw drive 212 to move the plate 166 and arm 178 to a new vertical position relative to the vertical probe slide 106. These same signals are also supplied to the remote cam unit 77, which, after a suitable delay, controls the speed of the weld wire drive motor 68 accordingly.

It will be noted that the sensing arm 178 which is driven vertically by the gap fill probe drive motor 206, is carried on the vertical probe slide 106 which in turn is driven vertically by the vertical probe drive motor 110. The sensing arm 178 thus serves as an auxiliary slide which moves up and down on the main probe slide 106.

It will be appreciated from the foregoing that the horizontal and vertical probe drive motors 108 and 110 are energized each time lateral and vertical seam deviations are sensed and the gap fill drive motor 206 is energized each time a gap width deviation is sensed. Moreover these motors are energized by an amount just sufficient to bring the probe (i.e. the probe 40 or the gap sensing wheel 194 and vertical deviation sensing roller 198) to new positions corresponding to the extent of these deviations.

According to the present invention the electrical signals which energize the probe and gap fill drive motors 108, 110 and 206 are also made use of to control the horizontal and vertical torch drive motors 86 and 96 and the weld wire drive motor 68; but because the torch saddle trails the probe saddle by a finite distance the probe drive motor signals are converted to pin position information in the remote cam unit 77 and this information is delayed by a length of time required for the torch saddle to traverse that finite distance. The pin position information is then reconverted to electrical signals which control the torch and weld wire drive motors 86, 96 and 68.

FIGS. 10-15 show a remote cam unit according to the present invention for storing and delaying horizontal, vertical and gap width information until the torch saddle has moved in the forward or Z direction by an amount equal to the distance between the probe and torch.

Figure 10:
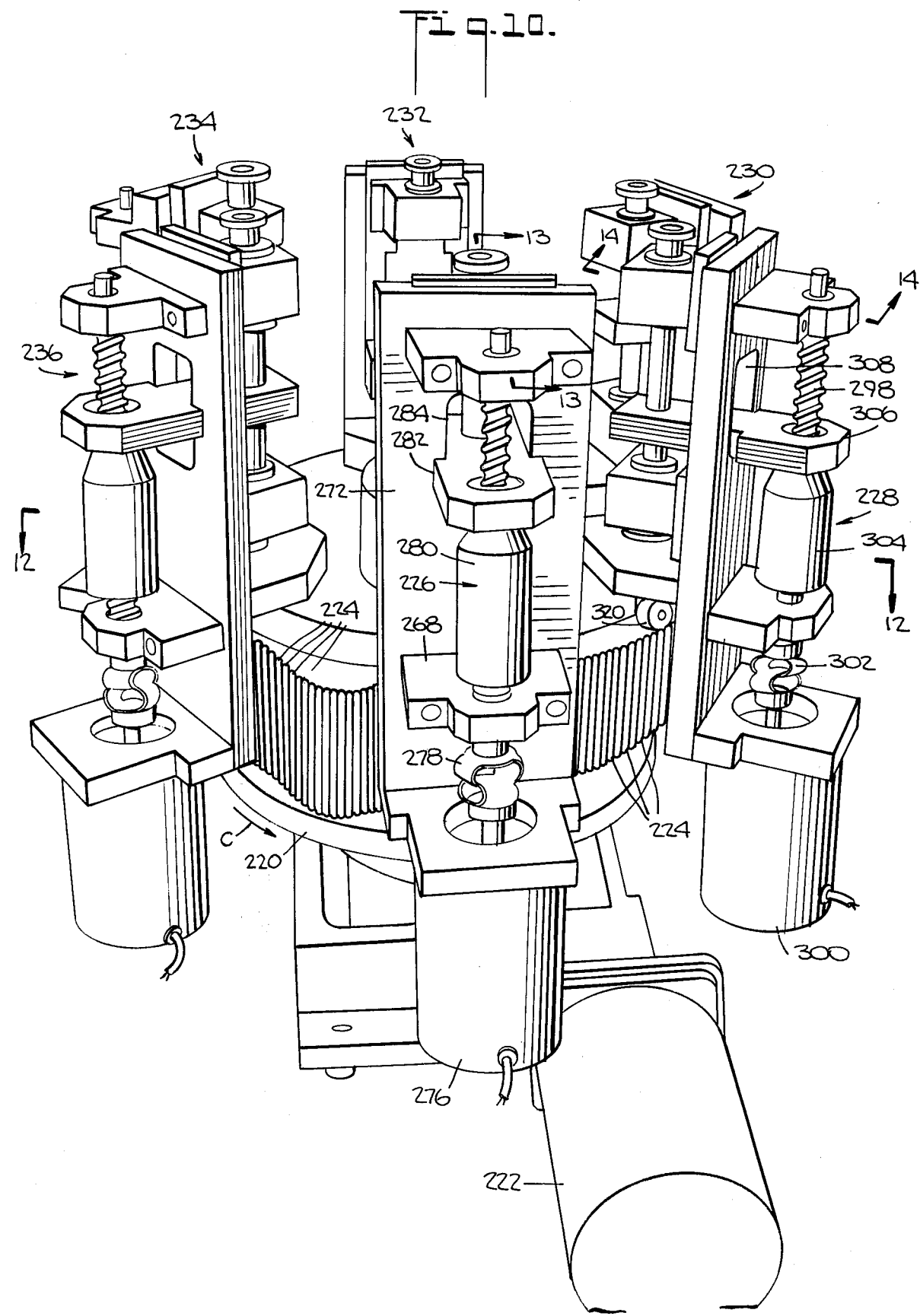
FIG. 10 is an overall perspective view of a pin cam memory device used in the welding apparatus of FIG. 1.

As shown in FIG. 10 there is provided a cam wheel 220 which is driven by a cam wheel drive motor 222 to rotate in the direction of an arrow C. About the periphery of the wheel 220 are mounted a plurality of closely spaced pins 224 arranged with their axes parallel to the wheel axis. The wheel 220 is magnetized and the pins, which are steel, are held magnetically and frictionally to the edge of the wheel. As a result the pins may be pushed up and down along their axes by a limited amount and they will remain in the position at which they were set until they are repositioned.

There are arranged around the outside of the wheel 220 a vertical deviation setting assembly 226, a vertical deviation reading assembly 228, a horizontal or lateral setting assembly 230, a horizontal or lateral reading assembly 232, a gap width setting assembly 234 and a gap width reading assembly 236. As will be seen more fully hereinafter, the setting assemblies 226, 230 and 234 operates to adjust the longitudinal positions of the pins 224 which pass under them as the wheel 220 turns and the reading assemblies 228, 232 and 236 operate to detect the longitudinal position of the pins which have been set by their associated setting assemblies.

The setting assemblies 226, 230 and 234 are connected to receive signals from the vertical and horizontal probe drive motors 110 and 108 and from the gap fill drive motor 206, so that the pins 224 which pass by these assemblies are set to positions corresponding to the vertical (Y direction) horizontal or lateral (X direction) and gap width deviations sensed by the probe assembly. The rotational speed of the wheel 220 and the distance between each reading assembly and its associated setting assembly is set so that the length of time required for each pin 224 to pass from a setting assembly to a reading assembly is the same as the length of time required for the torch 38 to traverse the distance between it and the probe 40 (or the gap sensing wheel 194 and vertical deviation sensing roller 198 in the case of the embodiment of FIGS. 8 and 9). The reading assemblies 228, 232 and 236 generate signals corresponding to the longitudinal position of the pins passing by them; and these signals are used to control operation of the horizontal and vertical torch drive motors 86 and 96 and the wire drive motor 68. It will be appreciated that the torch 38 and the weld wire feed will follow the deviations sensed by the probe but the timing of the torch and wire feed adjustments will be delayed until the torch reaches the proper location along the seam or gap being welded.

Figure 11:
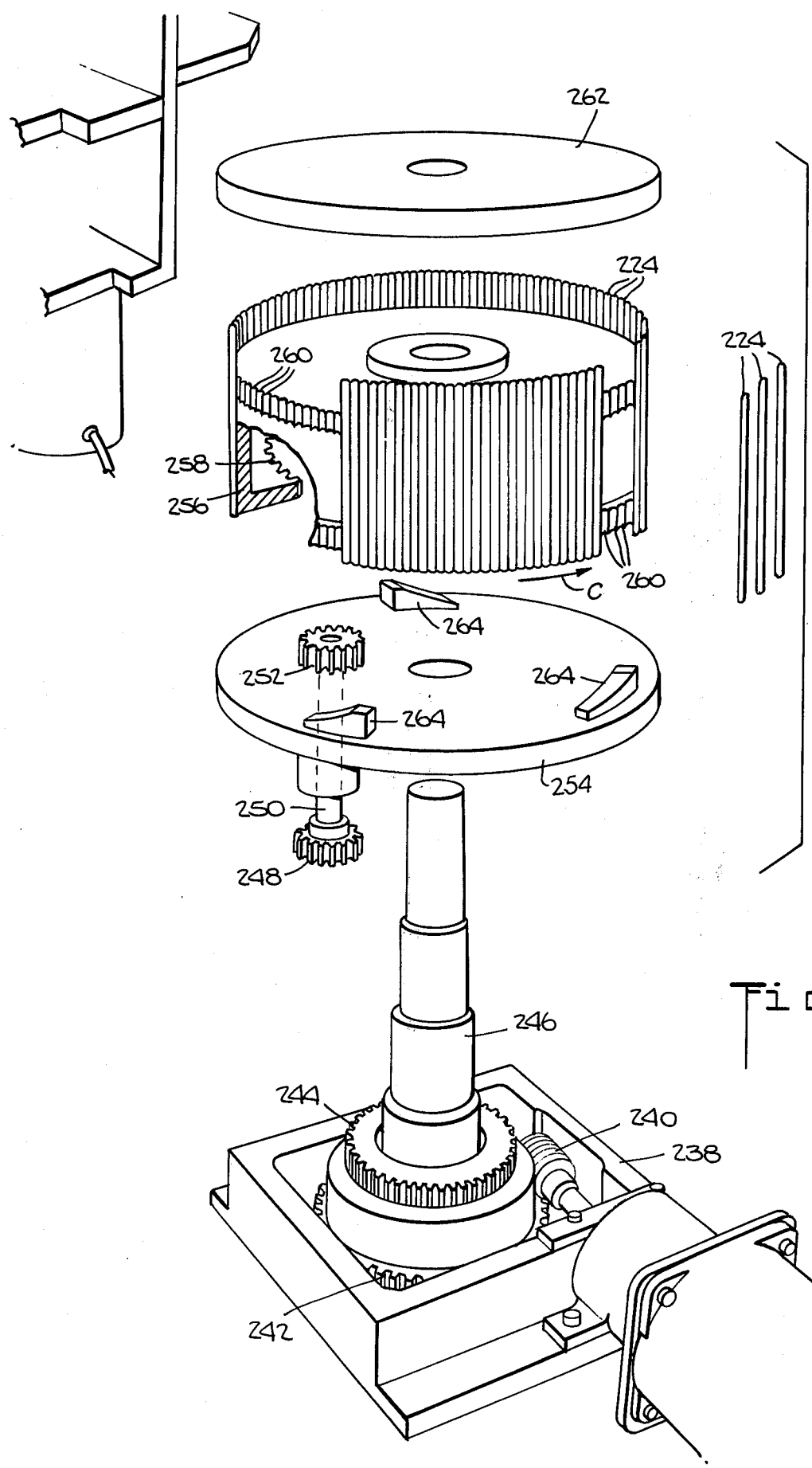
FIG. 11 is an exploded perspective view of the welding apparatus of FIG. 10.

The internal construction of the cam wheel 220 and its drive arrangements are best seen in the exploded view of FIG. 11. As there shown, the cam wheel drive motor 222 is bolted to a housing 238 and a worm gear 240 on the motor 222 engages with a worm wheel 242 mounted in the housing 238. A first drive gear 244 is mounted concentrically with the worm wheel 242 to turn about a fixed spindle 246. The first drive gear 244 engages a driven offset idler gear 248. The gear 248 is mounted on one end of a shaft 250 and a driven offset idler gear 252 is mounted on the outer end of the shaft. The shaft 250 extends through a lower plate 254 which is fixed to the spindle 246. A wheel casing 256, formed with an internal ring gear 258, is mounted to turn on the spindle 246 above the lower plate 254 with the internal ring gear 258 engaged with the driver offset idler gear 252. The periphery of the wheel casing 256 is formed with closely spaced guide grooves 260 which accommodate the pins 224. The casing 256 may be magnetized to hold the pins in place, or alternatively, separate magnetic means may be positioned inside the casing to exert a magnetic holding force on the pins. The spindle 246 extends through the wheel casing 256 and an upper fixed plate 262 is secured to the upper end of the spindle.

It will be seen from the foregoing that as the cam wheel drive motor 222 causes its worm gear 240 to turn this turns the worm wheel 242 and the first drive gear 244. This causes the driven and driver offset idler gears 248 and 252 to turn the wheel casing 256 and the pins 224 carried on the wheel casing. In this manner the pins 224 are carried around by the wheel so that each pin moves in succession from setter assembly, to reader assembly, to setter assembly, etc. The various setting and reading assemblies are bolted to the upper fixed plate 262.

It will also be noted that pin presetting ramps 264 are positioned on the lower fixed plate 254. These ramps are located in the path of the pins carried around by the wheel casing 256 and as the pins engage each ramp they are pushed upwardly by the ramp to an uppermost position. The pin presetting ramps are located just ahead of each setting assembly 226, 230 and 234 so that the pins are brought to their uppermost position before they reach the assembly. This can be seen in FIG. 15. The setting assemblies operated to set the height of the pins by pushing them down from their uppermost preset position to a position corresponding to the height of a pin setting element in the associated setting assembly.

As can be seen in FIG. 12, the setting assemblies 226, 230 and 234 and the reading assemblies 228, 232 and 236 are bolted to the upper plate 262 by means of bolts 265 which pass through the mounting flanges 268 on these assemblies. Slots 266 are provided in the mounting flanges 268 of the reading assemblies. The circumferential spacing of the reading assemblies with respect to their associated setting assemblies can be adjusted by loosening the bolts 265 and sliding the reading assemblies along the plate 262. In this manner changes in the distance between the torch and probe saddles 42 and 44 can be accommodated.

Figure 15:
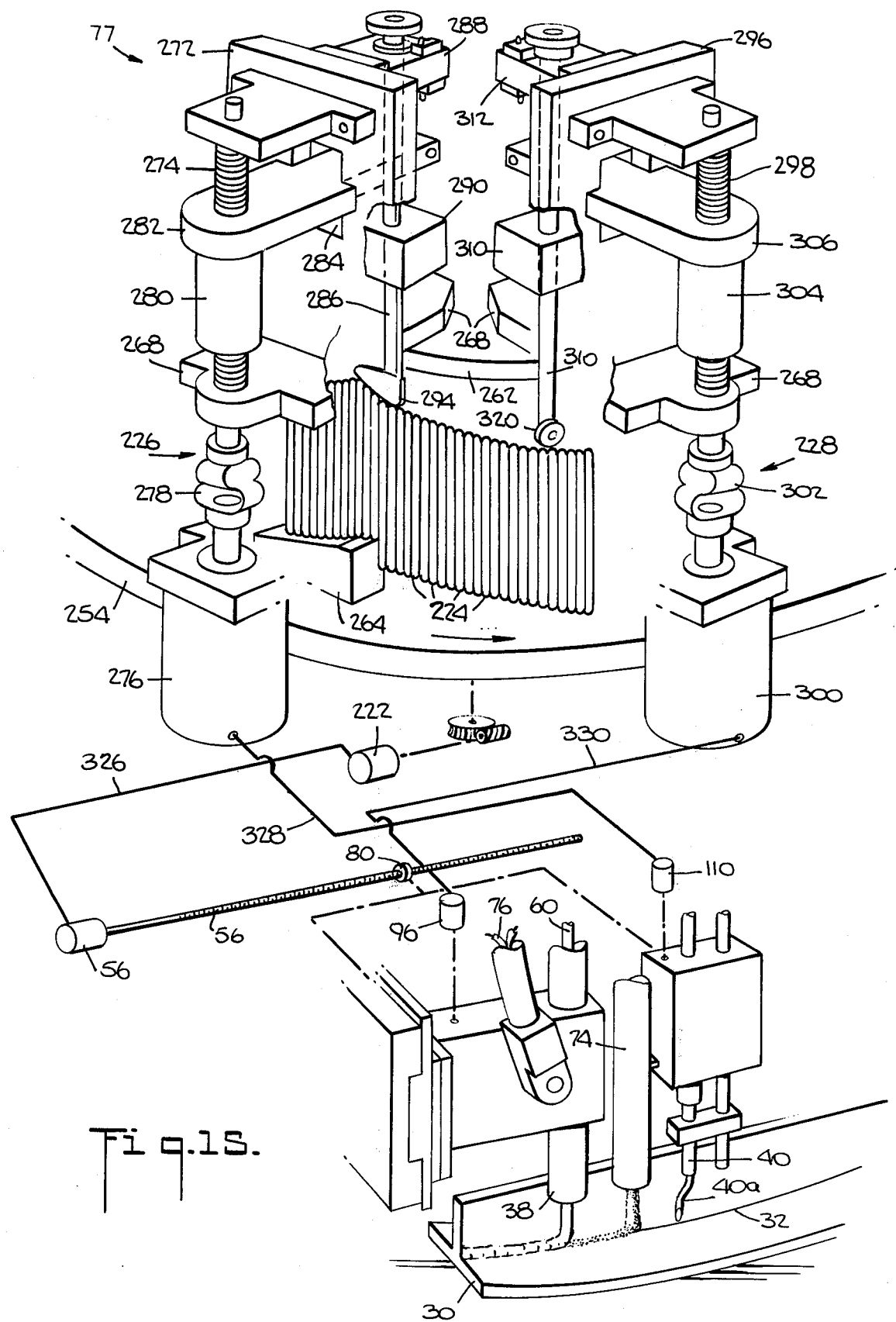
FIG. 15 is a perspective view, partially schematic showing the synchronization of the torch and probe and main drive of the welding apparatus of FIG. 1 with the memory device of FIG. 10.

FIGS. 13 and 15 show the general construction of the setting assemblies 226, 230 and 234. As can be seen the mounting flange 268, which is bolted to the upper plate 262, is connected to a vertical support 272; and this supports, on the outside thereof, a vertical drive screw 274. A pin setter motor 276 is mounted near the lower end of the support 272 and is connected by a coupling 278 to turn a drive screw 274. A ball screw drive 280 rides up and down on the drive screw 274 as the screw turns. The ball screw drive is connected to an adjustment plate 282 which moves up and down with it. The adjustment plate passes through a guide slot 284 in the vertical support 272 and is connected, on the other side of the support to a push rod 286. The push rod 286 is guided for up and down movement by upper and lower slides 288 and 290 mounted on the support 272. The lower end of the push rod 286 passes through an opening 292 in the flanges 268; and a ramp shaped setting element 294 (see FIG. 15) on the lower end of the push rod engages the upper ends of the pins 224 and forces them to a vertical position corresponding to the vertical elevation of the push rod as set by the turning of the motor 276. As indicated above, and as can be seen in FIG. 15, the ramp 264 sets the pins 224 to their uppermost position just before they are engaged and pushed down to a predetermined set position by the setting element 294.

FIGS. 14 and 15 show the general construction of the reading assemblies 228, 232 and 236. As in the case of the setting assemblies, the mounting flange 268 of each reading assembly is connected to a vertical support 296 and this supports on the outside thereof a vertical drive screw 298. A reader motor 300 is mounted near the lower end of the support 296 and is connected by a coupling 302 to turn the drive screw 298. A ball screw drive 304 rides up and down on the drive screw 298 as the screw turns and this drive is connected to a sensing plate 306 which moves up and down with it. The adjustment plate passes through a guide slot 308 in the support 296.

A reader rod 310 is guided for up and down movement on the opposite side of the support 296, in alignment with the pins 224, by means of upper and lower guides 312 and 314 mounted on the support. As can be seen in FIG. 14 the reader rod 310 passes freely through openings 316 and 318 in the sensing plate 306 and in the flange 268 respectively; and a sensing roller 320 on the lower end of the rod 310 engages the upper ends of the pins 224 as shown in FIG. 15.

The reader rod 310 has attached to it an up sensing microswitch 322 and a down sensing microswitch 324 arranged, respectively, below and above the sensing plate 306 and closely spaced to it. As will be described more fully hereinafter, the microswitches 322 and 324 are connected so that, when actuated, they will cause the reader motor 300 to turn in a corresponding direction. The reader rod 310 is biased downwardly against the top of the pins 224 by its own weight.

In operation of the reading assembly the pins 224 being carried under the reader rod 310 by rotation of the cam wheel 220 cause the rod to be moved up or allow it to drop down and thereby actuate either the up sensing or the down sensing microswitch 322 or 324. This in turn completes a circuit to cause the motor 300 to turn the drive screw 298 to move the sensing plate 306 up or down until the switch becomes deactuated. The signals which operate the motor 300 are also communicated to a corresponding one of the horizontal vertical torch drive motors 86 or 96 or to one or more welding parameter controls, e,g. for weld wire feed rate, main saddle speed, welding current or voltage.

FIG. 15 also illustrates the synchronization of the probe and torch saddles and the pin cam assembly for one variable, e.g. vertical weld seam deviations. As can be seen, the main saddle drive motor 56 and the cam wheel drive motor 222 are connected to be driven in synchronism (illustrated sumbolically by a line 326). Similarly, the vertical probe drive motor 110 and the pin setter motor 276 of the vertical deviation setting assembly 226 are connected also to be driven in synchronism (illustrated symbolically by a line 328). Further, the reader motor 300 of the vertical deviation reading assembly 228 and the vertical torch drive motor 96 are connected to be driven in synchronism (as illustrated symbolically by the line 330). This arrangement causes the torch and probe saddles 42 and 44 to be driven along the workpiece 30 at a fixed spacing from each other while the cam wheel 220 moves the pins 224 from the vertical deviation setting assembly 226 to the vertical deviation reading assembly 228 at a rate such that it takes each pin 224 the same length of time to move from the setting assembly 226 to the reading assembly 228 as it takes for the torch 38 to traverse the distance separating it from the probe 40. The vertical deviation signals generated by the probe saddle are applied to the setting assembly 226 and the seam deviation sensed by the probe is thus stored, in the form of longitudinal position, on the pins 224 passing under the setting assembly. Because of the magnetic attraction between the wheel and the pins, they are held at their thus set longitudinal positions while they are being carried around over to the reading assembly 228. Since the cam wheel 220 is driven in synchronism with the main saddle 46, the pins which have been set by the setting assembly reach the reading assembly at the same time that the torch reaches the position where the probe was when the deviation was sensed. When the pins reach the reading assembly 228 the reading assembly senses their longitudinal position and generates corresponding signals which are simultaneously applied to vertical torch drive motor 96. In this manner the torch 38 is vertically positioned according to the deviations sensed by the probe and stored in the remote cam unit. In similar manner lateral or horizontal seam deviations and gap width variations are stored and used for welding control. It is a feature of the remote cam unit of this invention that the same cam wheel can store simultaneously several independently varying functions, such as vertical and horizontal seam deviations and gap width variations.

Because the pin readers incorporate self-driven probes, the pin readers exert extremely low reaction force on the pins 224. This, plus the fact that the pin cam unit 77 is remotely located from the welding apparatus, permits the pins to be held to the cam wheel 220 by magnetism and friction without need for any special pin locking devices. The elimination of pin locking devices also contributes to accuracy of the apparatus because it avoids the potential for pin movement when the locking device is applied.

Figure 16:
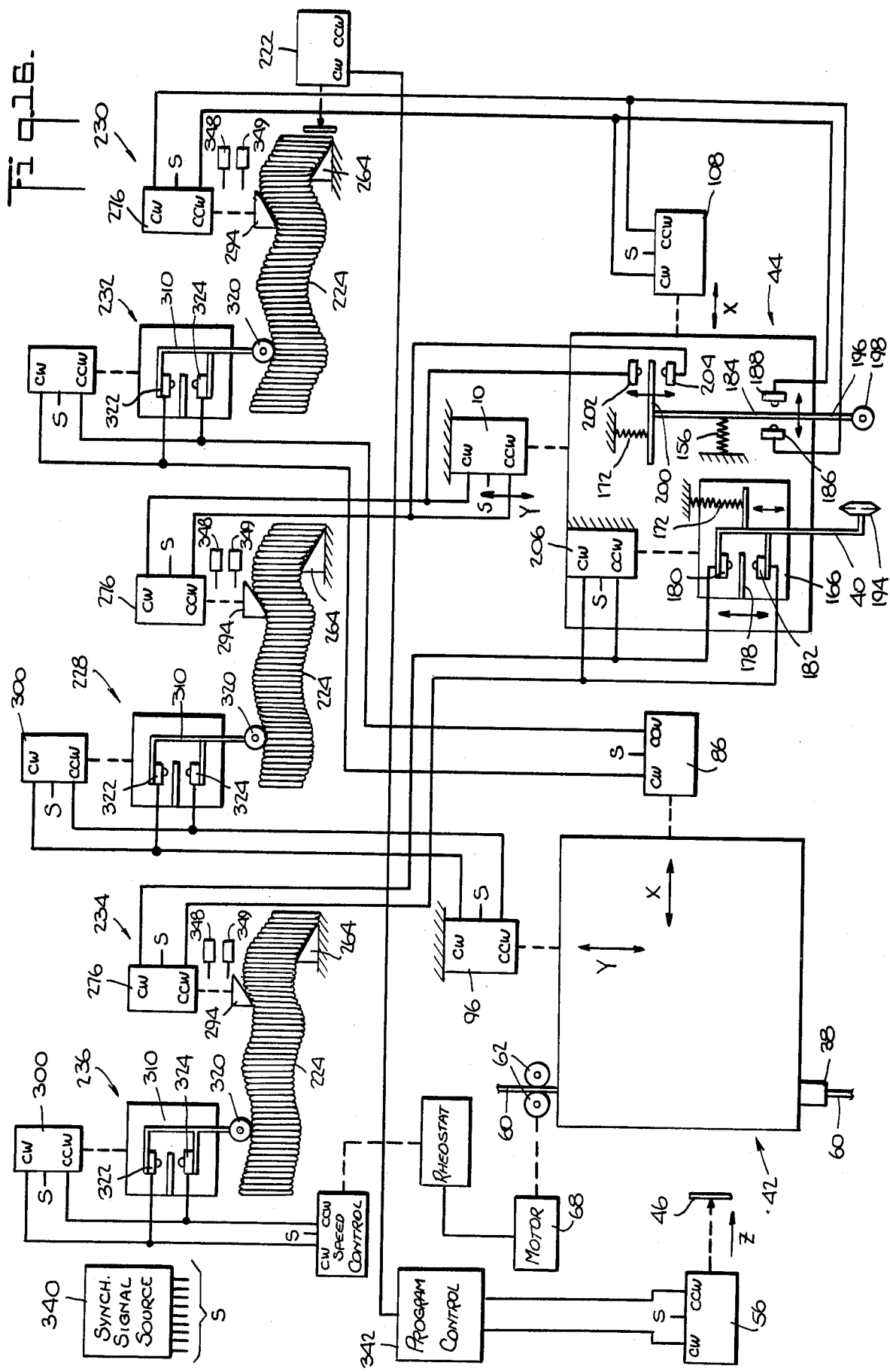
FIG. 16 is a schematic showing electrical connections employed in the apparatus of FIG. 1.

FIG. 16 shows, schematically, a wiring arrangement interconnecting the various microswitches and drive motors. The motors are preferably all of the pulse driven type, although any motors capable of being driven in synchronism with each other may be used. In the arrangement shown the motors are of the well-known pulse driven type and they each undergo a precise predetermined angle of rotation in response to each pulse applied to them. These motors also each have a CW (clockwise rotation) and a CCW (counterclockwise rotation) input terminal which upon receiving an input signal causes the motor to turn in the clockwise or counterclockwise direction in accordance with synchronizing signals, such as pulses which it receives at a synchronize terminal S. A synchronizing signal source 340 which may be an oscillator or a pulse generator, is provided to supply pulses in synchronism to the terminal S of each of the motors. The connections between the pulse source 340 and these motors are omitted from FIG. 16 for clarity.

The main saddle drive motor 56 and the cam wheel drive motor 222 are connected together via a program control 342. The program control may simply comprise a manually actuable switch which connects a source of voltage either to the CW or CCW terminal of the main saddle drive motor 56 alone, or to the CW terminals of the main saddle drive motor 56 and the cam wheel drive motor together. No connection is made to the CCW terminal of the cam wheel drive motor because there is no need to drive the cam wheel in reverse. The program control 342 may also include other arrangements for presetting the position of the torch and probe, presetting the cam pin setters and for returning the torch and probe to their home positions upon completion of a welding operation. It will be noted that since the main saddle drive motor 56 and the cam wheel drive motor 222 are driven in synchronism from the synchronizing signal source 340 the speeds of the main saddle 46 and of the cam wheel 220 are also synchronized.

As can also be seen in FIG. 16, the in sensing and out sensing microswitches 186 and 188 on the probe saddle 44 are connected to corresponding CW and CCW terminals of the horizontal drive motor 108 as well as to corresponding CW and CCW terminals of the setter motor 276 of the horizontal setting assembly 230. Likewise, the up sensing and down sensing microswitches 202 and 204 on the probe saddle are connected to corresponding CW and CCW terminals of the vertical probe drive motor 110 and also to corresponding CW and CCW terminals of the setter motor 276 of the vertical setting assembly 226. The up and down sensing microswitches on the probe plate 146 are connected to corresponding CW and CCW terminals of the gap fill drive motor 206 and to corresponding CW and CCW terminals of the setter motor 276 of the gap width setting assembly 234.

As further shown in FIG. 16 the up and down sensing microswitches 322 and 324 in the vertical and horizontal deviation and gap width reading assemblies 228, 232 and 236 are each connected to corresponding CW and CCW terminals, respectively, of the reader motors 300 of those assemblies and also the CW and CCW terminals, respectively of the vertical torch drive motor 96, the horizontal torch drive motor 86 and a speed control 344 arranged in conjunction with the wire drive motor 68. The speed control may comprise a synchronous motor which operates a rheostat 346 to adjust the speed of the motor 68 in accordance with the position of the sensing roller 320. It will be understood that appropriate connections may also be made from the reader motor 300 of the gap width reading assembly 236 to controls for adjusting other welding parameters such as main saddle drive speed or welding current or voltage.

Each of the microswitches 180, 182, 186, 188, 202, 204, 322 and 324 is arranged in a circuit such that it applies an electrical signal, when activated, to the CW and CCW terminal of the drive motors to which it is connected. Thus while each switch is actuated it will cause the two motors to which it is connected to be driven in snychronism. It should be understood that it is not necessary that the same synchronizing signal source 340 be used for all the motors. It is only necessary that the paired motors on the welding apparatus and the remote cam unit be driven in snychronism.

It will be seen that the system as described includes a first synchronizing means connected between the main saddle drive motor 56 and the cam wheel drive motor 222, a second synchronizing means connected between each probe drive motor and its associated pin setter motor and a third synchronizing means connected between each pin reader motor and its associated torch drive or welding control motor.

In operation of the above described welding system the probe and torch saddles are driven (in the Z direction) along the workpiece at a fixed distance from each other while the cam wheel turns to move the pins 224 successively between each setter and reader assembly. During this operation the vertical (Y direction) deviations of the workpiece cause the roller 198 to move up and down and this actuates the microswitches 202 and 204 to energize the vertical probe drive motor 110 and the setter motor 276 of the vertical deviation setting assembly 226. The ram shaped setter element 294 moved up and down by the motor 276 thus sets the vertical position of the pins 224 passing under it. After a predetermined duration, set by the speed of the cam wheel 220, the pin passes under the roller 320 of the vertical deviation sensing assembly 228. This causes one or the other of the microswitches 322 and 324 to be actuated so as to drive the reader motor 300 of the sensing assembly 328 and the vertical torch drive motor 96 which moves the torch in accordance with the vertical workpiece deviation sensed by the probe.

Simultaneously with the foregoing, and in the same manner, the gap sensing wheel 194 senses gap width and adjusts the longitudinal position of the pins 224 at the gap width setting assembly 234 in another sector of the cam wheel; and the gap width reading assembly 236 thereafter adjusts the speed of the wire driven motor 68 accordingly.

Also and at the same time the lateral (X direction) deviations are sensed and imposed on the pins in a third sector of the cam wheel and these pin positions are thereafter used to adjust the lateral position of the torch 38. It will be noted that the bias springs 172 and 156 bias the probe elements in a predetermined direction. This causes the microswitches 180, 186 and 204 to be actuated. As a result the system becomes a seam seeking system. That is the various probe motors will drive the probe slides as a result of the bias activation of these microswitches until the probe slides bring the probe elements up to the seam at which time the probe elements will be urged in the opposite direction to stop the probe drive motors.

Prior to start of the welding operation the probe and torch may be brought from a home position to the starting position on the workpiece 32. To do this, the program control 342 is switched so that the main motor 56 and the cam wheel drive motor 222 are stopped. The microswitches 180, 182, 186, 188, 202 and 204 in the probe saddle are disconnected or otherwise rendered ineffective and separate signals are applied to the terminals of the probe horizontal and vertical drive motors 108 and 110 to move the probe 40 (along with the vertical sensing rod 196 if gap width is to be recorded) horizontally and vertically until the probe is close to the weld seam. Thereafter the system is connected as shown in FIG. 16 and the probe drive motors will bring the probe into proper contact with the seam.

The torch horizontal and vertical drive motors 86 and 96 are then disconnected from the readers 228 and 232 and are actuated by separate circuit means, not shown. These separate circuit means include switches operable by energization of the photocells 130 and 138. Thus the horizontal torch slide 82 will move laterally until the horizontal alignment arm 124 mounted thereon lines up with the alignment arm 126 on the horizontal probe slide 104 (FIG. 4). This brings the photocell 130 into alignment with the light 128. Energization of the photocell interrupts the energization of the horizontal torch drive motor 86 so that the torch 38 becomes horizontally or laterally aligned with the probe 40. The vertical torch drive motor 86 is then energized in similar fashion until the torch vertical alignment arm 132 or the torch vertical slide 92 brings the light 136 into alignment with the photocell 138 on the vertical alignment arm 134 of the vertical probe slide 106. At this point the probe and torch are aligned for the start of the welding operation.

Before the welding operation begins, the pin setter and pin reader assemblies are first brought to their mid-position so that the pins 224 can undergo maximum excursion in either direction. This mid-position pre-positioning is carried out while the setter and reader assemblies are disconnected from the probe and torch drive motors, 108, 110, 206, 86 and 96 and the speed control 344. As shown in FIG. 16 there is provided in association with each setter assembly 226, 230 and 234 an upper limit switch 348 and a mid-position limit switch 349, arranged, respectively, to be engaged and actuated when the pin setters 294 reach a predetermined uppermost position and a mid position. With the setter motors 276 disconnected from their associated probe motors 108, 110 and 206, the setter motors are first energized to drive their pin setters 294 upwardly until the upper limit switch 348 is activated. The setter motor 276 is then reversed to drive its pin seter 294 downwardly until it reaches its mid position at which point the mid position switch 349 is activated and the setter motor is stopped. Thereafter, with the setter and reader motors 276 and 300 still disconnected from their associated probe and torch saddles, the cam wheel drive motor 222 is driven. This brings the pins 224 to the mid-position setting of the setter motors 276 and this mid position setting is communicated by the pins to the reader assemblies 228, 232 and 236 so that the reader assemblies drive themselves to this mid position setting. Upon completion of this operation the setter and reader assemblies are reconnected with the probe and torch assemblies as shown in FIG. 16 and the welding operation may begin. When welding has been completed the torch and probe drive motors 86, 96, 108 and 110 are separately energized to return the probe and torch to their home position.

The specific circuits for disconnecting the setter and reader motors from the probe and torch drive motors and for separately energizing the reader and setter motors to the mid-position established by the limit switches 348 and 349 have not been shown in order to avoid unnecessary cluttering of the drawings and because such circuits will be readily apparent to those skilled in the art.

Figure 17:
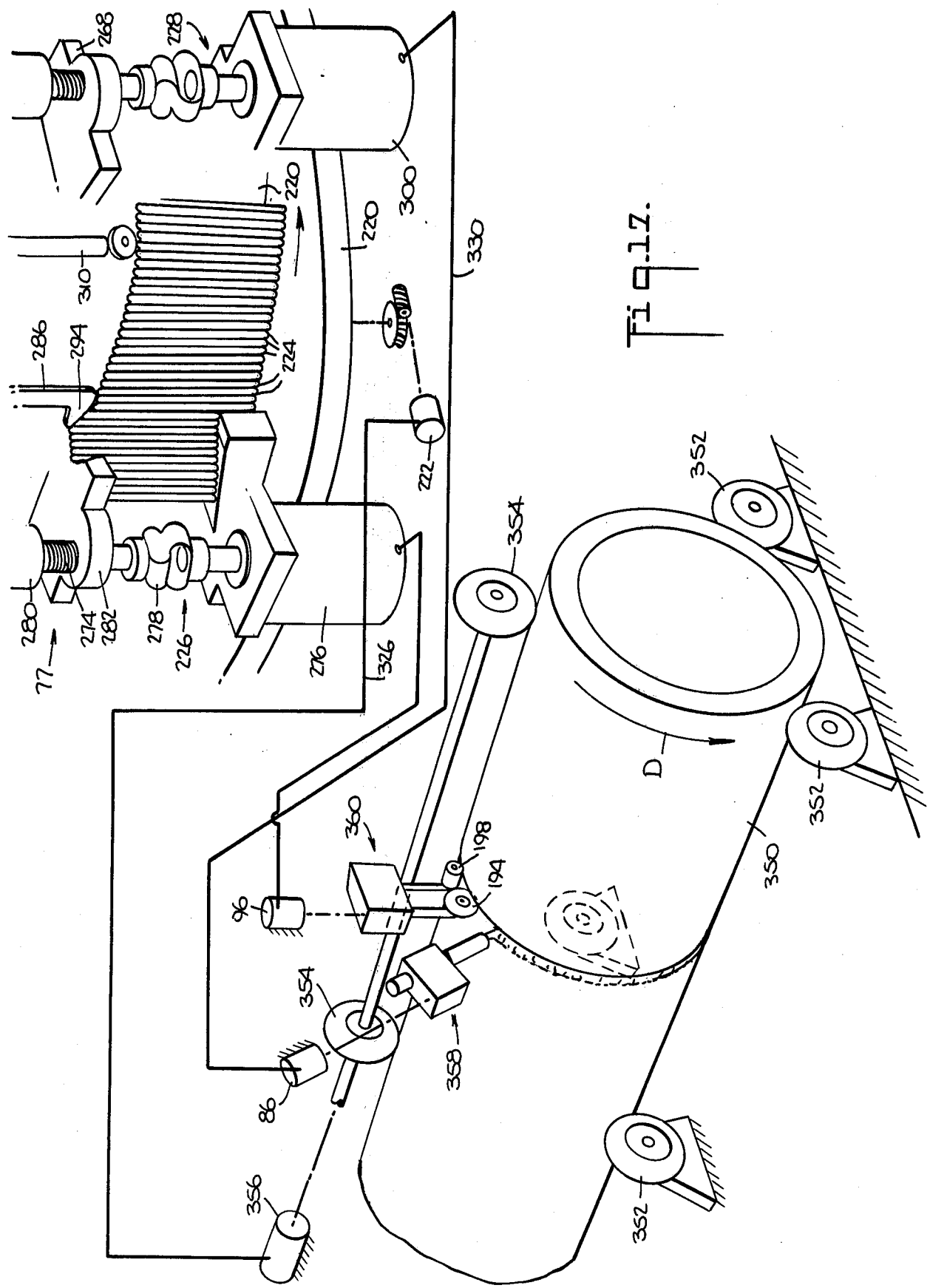
FIG. 17 is a view similar to FIG. 15 but showing an alternate welding apparatus with a stationary probe and torch assembly and a movable workpiece.

In the above described embodiment of the invention the workpiece being welded was held stationary while the torch and probe moved over it. The present invention in one aspect provides arrangements by which accurate welding can be carried out on a moving workpiece. FIG. 17 shows such an arrangement as applied to the welding of the periphery of a large diameter drum. In FIG. 17 a drum 350 is mounted on support rollers 352 for rotation about its longitudinal axis. The drum is rotated by means of drive rollers 354 driven by a main drive motor 356. A torch assembly 358, which may be of the same general construction as the torch saddle 42 of the preceding embodiment, is mounted at a fixed position adjacent the drum periphery and a probe assembly 360, which also may be of the same general construction as the probe saddle 44 of the preceding embodiment is mounted at a fixed position displaced circumferentially from the torch assembly. Only the vertical torch and probe drive motors 86 and 96 are shown in FIG. 17 but it will be understood that horizontal and gap width motors may be provided depending on the nature of the weld to be made.

As shown in FIG. 17 the main drive motor 356 is connected to operate in synchronism with the cam wheel drive motor 222 of the cam unit 77. Also the vertical probe drive motor 96 is connected to be driven in synchronism with the setter motor 276 of the vertical deviation setting assembly 226 and the vertical torch drive motor 86 is connected to be driven in synchronism with the reader motor 300 of the vertical deviation reading assembly 228. Thus, so long as the cam wheel 220 is driven at a speed such that each of the pins 224 takes the same amount of time to move from the setter to the reader assembly as is required for a point on the drum to move from the probe to the torch the probe sensed deviations will be applied to the torch at the same time as those deviations arrive at the torch.

In operation the drum 350 is driven rotationally in the direction of the arrow D so that each point on a groove or seam being welded is brought first under the probe and thereafter under the torch. The probe senses radial and axial deviations of the groove or seam, and gap width, if desired; and these deviations are used to set the pins 224 or the cam wheel 220 as above described. Thereafter, when these deviations arrive under the torch, the torch will be driven to follow them and thereby provide an accurate weld. It will be understood that instead of synchronizing drum rotational speed to the rotational speed of the cam wheel 220, one may alternatively use a separate measuring device such as a tachometer or a pulse generating wheel riding on the drum to produce signals representative of the drum speed. These signals may be used to control the speed of the cam wheel.

FIGS. 18–20 show a preferred probe construction for use in the present invention. As can be seen there is provided a probe housing 360 containing a probe rod 362 and a vertical sensing rod 364 which coincide, respectively, with the probe 40 and the vertical detection probe 196 previously described. As can be seen in FIG. 18, the rods 362 and 364 are connected together by means of a connector block 365 so that the rods move together as a unit. As with the previous embodiments, this arrangement is used when no gap is needed.

Vertical compression springs 366 extend around the rods 362 and 364 between flanges 368 on the rods and the roof of the housing 360 to bias the rods downwardly. Skirts 370 are provided between the lower end of the housing 360 and the projecting portion of the rods 362 and 364 to prevent dust or other foreign material from entering the housing. As shown in FIG. 18 an up sensing and a down sensing microswitch 372 and 374 are mounted in the housing 360 above and below an activation arm 376 on the vertical sensing rod 364. A spreader spring 378 is positioned between the microswitches 372 and 374 to hold them apart. The microswitches can be individually adjusted, however, by means of setscrews 380.

Turning now to FIGS. 19 and 20, it will be seen that probe rods 362 and 364 pass through a block 382 in the lower part of the housing 360 and this block is centered by means of a pair of lateral springs 384. Lateral microswitches 386 are positioned inside the housing on opposite sides of the block 382. With the above described arrangement the probe rods are moved easily in the vertical and lateral directions for accurate sensing of weld seam deviations and yet the probe assembly is compact and rugged.

Having thus described the invention with particular reference to the preferred forms thereof, it will be obvious to those skilled in the art to which the invention pertains, after understanding the invention, that various changes and modifications may be made therein without departing from the spirit and scope of the invention as defined by the claims appended hereto.

What is claimed and desired to be secured by Letters Patent is:

1. A welding apparatus comprising:
   workpiece mounting means for mounting a workpiece to be welded,
   a probe and torch assembly including a probe and a welding torch positioned a fixed distance from each other in a given direction and each being separately movable transversely of said given direction,
   main drive means for producing relative movement between said workpiece mounting means and said probe and torch assembly in said given direction,
   said probe being constructed to follow transverse deviations of a seam to be welded during said relative movement, said probe being provided with a probe motor to drive the probe to follow said transverse deviations, said probe further being provided with a probe sensor to sense said deviations and a probe switch actuable by said probe sensor, said torch being provided with a torch drive motor arranged to drive said torch to undergo transverse deviations, an adjustable contour cam positioned remotely from said probe and torch assembly, said cam comprising a pin mounting means and a plurality of pins positioned side by side and forming a line on said mounting means, a pin setter and reader assembly including a pin setter and a pin reader mounted at a predetermined distance from each other along said line and each being separately movable in the longitudinal direction of the pins in contact with said pins, cam drive means for producing relative movement between said pin mounting means and said pin setter and reader assembly along said line, so that said setter and reader successively contact different ones of said pins during said relative movement, said pin reader being constructed to follow the longitudinal positions of the pins it contacts during said relative movements, said pin reader being constructed and arranged to follow said longitudinal positions of the pins, said pin reader further being provided with a reader sensor to sense changes in said longitudinal positions from one pin to the next, said pin setter including a pin setter drive motor arranged to adjust the longitudinal position of the pins it contacts during said relative movement, first synchronizing means connected between said main drive means and said cam drive means to synchronize their operation, second synchronizing means comprising a circuit including said probe switch, said probe motor and said pin setter drive motor connected such that actuation of said switch operates said probe motor and said pin setter drive motor together to synchronize the movements of said pin setter with those of said probe, and third synchronizing means comprising a circuit including said reader sensor and said torch drive motor connected such that actuation of said probe switch programs said pin setter and said pins to subsequently operate said reader sensor and said torch drive motor together to synchronize the movements of said torch drive with those of said pin reader.

2. Welding apparatus according to claim 1 wherein said torch drive motor and said setter drive motor each comprise a pulse motor, wherein said probe drive motor is a pulse motor and wherein means are provided to supply electrical pulses to said motors via said switches.

3. Welding apparatus according to claim 1 wherein said probe and torch are mounted and driven to follow and undergo both vertical and lateral weld seam deviations and wherein said adjustable cam comprises a rotating wheel with pins set around the periphery thereof and separate sets of pin setters and readers located at different sectors of said wheel.

4. Welding apparatus according to claim 1 wherein said adjustable cam comprises a cam wheel, said plurality of pins being held in side by side relationship around the periphery of said wheel to be carried around with it, said pins being movable longitudinally on the wheel parallel to the axis of the wheel and wherein said pin reader and pin setter are mounted above said wheel to contact the ends of the pins.

5. Welding apparatus according to claim 4 wherein said wheel is driven by a cam wheel drive motor in synchronism with said main drive means.

6. Welding apparatus according to claim 5 wherein said main drive means and said cam wheel drive motor are each pulse motors connected to receive the same synchronizing signals.

7. Welding apparatus according to claim 4 wherein said wheel is magnetic and wherein said pins are held to the periphery of said wheel by magnetism and friction.

8. Welding apparatus according to claim 6 wherein a ramp is mounted stationarily below said wheel to cause said pins to be moved to their uppermost position, said ram being positioned to engage the lower ends of said pins just prior to engagement thereof by said setter.

9. Welding apparatus according to claim 4 wherein said adjustable cam includes a stationary plate located above said hweel and wherein said pin setter and reader is attached to said plate.

10. Welding apparatus according to claim 4 wherein said pin setter comprises a ramp element for engaging the upper ends of said pins, a ball screw drive connected to said ramp, a drive screw in engagement with said ball screw drive and a drive motor mounted to turn said drive screw.

11. Welding apparatus according to claim 4 wherein said pin reader and pin setter are mounted to be adjustably positioned on said wheel at variable distances from each other along the line of pins.

12. Welding apparatus according to claim 1 wherein said probe includes a main probe slide driven in response to sensed vertical deviations of a workpiece and an auxiliary slide mounted to move on said main probe slide, a wedge shaped gap width sensing element on said auxiliary slide and drive means to move said auxiliary slide in response to movements of said gap width sensing element on said auxiliary slide.

13. Welding apparatus according to claim 12 wherein said adjustable contour cam includes a pin setter connected to adjust pins thereon in accordance with said signals from said gap width sensor and a pin reader to produce weld wire feed signals and wherein said torch includes a weld wire feed drive driven by said weld wire feed signals.

14. A welding apparatus according to claim 1 wherein said main drive means and said cam drive means each include a drive motor and wherein said drive motors are connected to be driven in synchronism with each other.

15. A welding apparatus according to claim 1 wherein said probe includes a movable slide, said probe motor being coupled to move said slide and said probe sensor being mounted on said slide and arranged to control the operation of said probe drive motor in response to weld seam deviations sensed by said sensing element.

16. A welding apparatus to claim 1 wherein said pin reader includes a movable member, said reader motor being coupled to drive said movable member, said reader sensor being mounted on said movable member and arranged to control the operation of said pin reader motor in response to the longitudinal displacement of pins moving past said reader sensor.

17. A welding apparatus according to claim 16 wherein said torch drive includes a torch slide and said torch drive motor being coupled to drive said torch slide.

18. A welding apparatus according to claim 1 wherein said probe comprises a base, a horizontal slide mounted to move horizontally on said base, a vertical slide mounted to move vertically on said horizontal slide a probe carried on said vertical slide, said probe sensor being movable by a small amount in both the vertical and horizontal direction, horizontal drive means including a horizontal probe drive motor mounted on said base and coupled to drive said horizontal slide, vertical drive means including a vertical probe drive motor mounted on said horizontal slide and coupled to drive said vertical slide, horizontal and vertical probe switches arranged on said vertical slide to be actuated by horizontal and vertical movements of said probe sensor respectively, said horizontal and vertical probe switches being connected to control operation of said horizontal and vertical drive motors respectively.

19. A welding apparatus according to claim 18 wherein said probe switches are connected to cause said horizontal and vertical drive motors to drive in directions corresponding to the direction of movement of said probe.

20. A welding apparatus according to claim 19 wherein said probe sensor is biased in a predetermined vertical and horizontal direction.

21. A welding apparatus according to claim 18 wherein said probe includes a probe block extending out from said vertical probe slide and pivotally mounted thereto about a vertical axis and a probe rod guided for vertical movement in said block a finite distance from said axis, said vertical probe switch being mounted to be actuated by vertical movements of said probe rod relative to said block and said horizontal probe switch being mounted to be actuated by pivotal movement of said block relative to said vertical slide.

22. A welding apparatus according to claim 21 wherein said probe block is movable up and down a limited amount on said vertical axis relative to said vertical probe slide, wherein a gap width drive motor is mounted on said vertical probe slide and is coupled to drive said probe block up and down, wherein a wedge shaped gap width sensing element is mounted on said block for up and down movement relative thereto and gap width sensing switches mounted on said block to be actuated by movements of said wedge shaped gap sensing element and to control operation of said gap width drive motor.

23. A welding apparatus according to claim 1 wherein said adjustable contour cam comprises a housing, upper and lower stationary plates, a cam wheel mounted for rotation between said plates, a plurality of pins carried on the periphery of said wheel in side by side relationship with their longitudinal axes parallel to the axis of said wheel and held frictionally against said wheel to be carried around as the wheel rotates, at least one pin setter assembly and one pin reader assembly mounted on said upper plate in alignment with the upper ends of said pins and a ramp positioned on said lower plate to engage the lower ends of said pins to move then to their uppermost position as they approach said pin setter assembly.

24. A welding apparatus according to claim 23 wherein a plurality of sets reader and pin setter assemblies are mounted on said upper plate in different rotational sectors of said cam wheel and wherein a corresponding plurality of ramps are mounted on said lower plate to be engaged by said pins just before they reach each setter assembly.

25. A welding apparatus comprising
workpiece mounting means for mounting a workpiece to be welded,
a probe and torch assembly including a probe and a welding torch positioned a fixed distance from each other in a given direction and each being separately movable transversely of said given direction,
main drive means for producing relative movement between said workpiece mounting means and said probe and torch assembly in said given direction,
said probe being constructed to follow transverse deviations of a seam to be welded during said relative movement and to generate electrical probe movement signals corresponding to said deviations,
said probe including a main probe slide driven in response to sensed vertical deviations of a workpiece and an auxiliary slide mounted to move on said main probe slide, a wedge shaped gap width sensing element on said auxiliary slide and drive means to move said auxiliary slide in response to movements of said gap width sensing element on said auxiliary slide,
said torch including a torch drive arranged to drive said torch to undergo transverse deviations in accordance with electrical torch drive signals,
an adjustable contour cam positioned remotely from said probe and torch assembly, said cam comprising a pin mounting means and a plurality of pins positioned side by side and forming a line on said mounting means,
a pin setter and reader assembly including a pin setter and a pin reader mounted at a predetermined distance from each other along said line and each being separately movable in the longitudinal direction of the pins in contact with said pins,
cam drive means for producing relative movement between said pin mounting means and said pin setter and reader assembly along said line, so that said setter and reader successively contact different ones of said pins during said relative movement,
said pin reader being constructed to follow the longitudinal positions of the pins it contacts during said relative movement and to generate electrical reader signals in accordance with said positions,
said pin setter including a pin setter drive arranged to adjust the longitudinal position of the pins it contacts during said relative movement in accordance with electrical pin setter signals applied thereto,
first synchronizing means connected between said main drive means and said cam drive means to synchronize their operation,
second synchronizing means connected to receive said electrical probe movement signals and to apply corresponding drive signals to said pin setter drive to synchronize the movements of said pin setter with those of said probe, and
third synchronizing means connected to receive said electrical reader signals and to apply corresponding drive signals to said torch drive to synchronize the movements of said torch drive with those of said pin reader.

26. Welding apparatus according to claim 25 wherein said adjustable contour cam includes a pin setter connected to adjust pins thereon in accordance with said signals from said gap width sensor and a pin reader to produce weld wire feed signals and wherein said torch includes a weld wire feed drive driven by said weld wire feed signals.

27. A welding apparatus comprising
workpiece mounting means for mounting a workpiece to be welded,
a probe and torch assembly including a probe and a welding torch positioned a fixed distance from each other in a given direction and each being separately movable transversely of said given direction,
main drive means for producing relative movement between said workpiece mounting means and said probe and torch assembly in said given direction,
said probe being constructed to follow transverse deviations of a seam to be welded during said relative movement and to generate electrical probe movement signals corresponding to said deviations,
said probe comprising a base, a horizontal slide mounted to move horizontally on said base, a vertical slide mounted to move vertically on said horizontal slide a probe carried on said vertical slide, said probe being movable by a small amount in both the vertical and horizontal direction horizontal drive means including a horizontal drive motor mounted on said base and coupled to drive said horizontal slide, vertical drive means including a vertical drive motor mounted on said horizontal slide and coupled to drive said vertical slide, horizontal and vertical switch means arranged on said vertical slide to be actuated by horizontal and vertical movements of said probe respectively, said horizontal and vertical switch means being connected to control operation of said horizontal and vertical drive motors respectively, said probe including a probe block extending out from said vertical probe slide and pivotally mounted thereto about a vertical axis and a probe rod guided for vertical movement in said block a finite distance from said axis, said vertical switch means being mounted to be actuated by vertical movements of said probe rod relative to said block and said horizontal switch means being mounted to be actuated by pivotal movement of said block relative to said vertical slide,
said torch including a torch drive arranged to drive said torch to undergo transverse deviations in accordance with electrical torch drive signals,
an adjustable contour cam positioned remotely from said probe and torch assembly, said cam comprising a pin mounting means and a plurality of pins positioned side by side and forming a line on said mounting means,
a pin setter and reader assembly including a pin setter and a pin reader mounted at a predetermined distance from each other along said line and each being separately movable in the longitudinal direction of the pins in contact with said pins,
cam drive means for producing relative movement between said pin mounting means and said pin setter and reader assembly along said line, so that said setter and reader successively contact different ones of said pins during said relative movement,
said pin reader being constructed to follow the longitudinal positions of the pins it contacts during said relative movement and to generate electrical reader signals in accordance with said positions,
said pin setter including a pin setter drive arranged to adjust the longitudinal position of the pins it contacts during said relative movement in accordance with electrical pin setter signals applied thereto,
first synchronizing means connected between said main drive means and said cam drive means to synchronize their operation,
second synchronizing means connected to receive said electrical probe movement signals and to apply corresponding drive signals to said pin setter drive to synchronize the movements of said pin setter with those of said probe, and
third synchronizing means connected to receive said electrical reader signals and to apply corresponding drive signals to said torch drive to synchronize the movements of said torch drive with those of said pin reader.

28. A welding apparatus according to claim 27 wherein said probe block is movable up and down a limited amount on said vertical axis relative to said vertical probe slide, wherein a gap width drive motor is mounted on said vertical probe slide and is coupled to drive said probe block up and down, wherein a wedge shaped gap width sensing element is mounted on said block for up and down movement relative thereto and gap width sensing switches mounted on said block to be actuated by movements of said wedge shaped gap sensing element and to control operation of said gap width drive motor.

29. A welding apparatus according to claim 1 wherein said pin reader further includes a reader switch actuable by said reader sensor and a reader motor constructed and arranged to move said reader and wherein the circuit of said third synchronizing means includes said reader switch and said reader motor and is connected such that actuation of said probe switch actuates said reader motor.

* * * * *